United States Patent [19]
Mathison et al.

[11] Patent Number: 5,643,386
[45] Date of Patent: Jul. 1, 1997

[54] ASSEMBLY PROCESS FOR FABRIC BAG PLUG

[75] Inventors: Allen D. Mathison, Richfield; Randy D. Smith, New Hope, both of Minn.

[73] Assignee: Cherne Industries Incorporated, Minneapolis, Minn.

[21] Appl. No.: 460,077

[22] Filed: Jun. 2, 1995

[51] Int. Cl.$^6$ .................................................. F16L 55/12
[52] U.S. Cl. ...................... 156/218; 156/227; 156/304.2; 138/93
[58] Field of Search ............................. 138/93; 156/203, 156/198, 218, 304.2, 158, 69, 583.3, 292

[56] References Cited

U.S. PATENT DOCUMENTS

| | | | |
|---|---|---|---|
| 1,760,750 | 4/1930 | Goodman . | |
| 3,276,481 | 10/1966 | McNulty | 138/93 |
| 3,414,140 | 12/1968 | Feldkamp . | |
| 3,919,030 | 11/1975 | Jones | 156/304.2 |
| 3,990,872 | 11/1976 | Cullen | 55/274 |
| 4,627,470 | 12/1986 | Carruthers | 138/93 |
| 4,883,094 | 11/1989 | Vetter | 138/93 |
| 5,209,266 | 5/1993 | Hiemsoth | 138/93 |
| 5,353,842 | 10/1994 | Lundman | 138/93 |
| 5,503,188 | 4/1996 | Petrone | 138/93 |

OTHER PUBLICATIONS

N.B. Products, N.B. Pipe Stoppers, Product Sheet, 2 pages.
Vetter, Vetter's Mini Lifting Bags, Product Sheet, 1 page.
Cherne Industries Incorporated, Cherne Single-Size Test-Ball Plug, 1992, Product Sheet, 1 page.

*Primary Examiner*—Michael W. Ball
*Assistant Examiner*—Michael A. Tolin
*Attorney, Agent, or Firm*—Anthony G. Eggink

[57] ABSTRACT

An assembly process for inflatable fabric bag plugs used to seal low pressure pipelines. The assembly process steps include marking and cutting coated fabric elements from a predetermined woven fabric and a plurality of sealing strips. The fabric elements and sealing strips include a plug body portion, main seam cap strips and first and second end seam cap strips. The process steps further include forming a flat tubular plug body from the plug body portion and bonding sealing rib extrusions thereto. A first end closure is formed in the plug body, a first tethering assembly is bonded over the first end closure and ports are installed therethrough for receiving an inflation assembly and a gauge assembly. A second end closure is formed in the plug body and an opposing tethering assembly is formed and attached thereover. The main seam cap strips, the first and second end seam cap strips and sealing strips are bonded over all internally and externally exposed fabric edges of the plug body to prevent leakage when the plug is inflated.

20 Claims, 16 Drawing Sheets

5,643,386

ASSEMBLY PROCESS FOR FABRIC BAG PLUG

BACKGROUND OF THE INVENTION

This invention relates to a pneumatic plug device and more particularly to an assembly process for inflatable fabric plugs. The fabric bag plugs of the present invention are used to seal low-pressure pipes or conduits that convey fresh water, natural gas, petroleum products, and other low-pressure fluids.

Although fabric bag plugs have been proposed and used in the past, several shortcomings have continually existed with the structures of these plugs. For example, prior art plugs made of fabric material have not been found to be sufficiently abrasion and puncture resistant to be suitable for extended use in a construction environment. Further, such bag plugs have been limited in usage range in that their diameters upon inflation have been restricted as to expansion. Due to the composition and structure of the prior art devices, it has also been difficult to maneuver and secure such fabric plugs in a pipeline. For example, tethering structures have been found inappropriate to use with prior art devices because their respective structural integrities may be compromised when the plugs are subjected to full usage pressures in a pipeline.

It has also been found difficult to manufacture prior art fabric bag plugs that are leak resistant on a consistent basis. It has been found, for example, that the fiber structure in the fabric material used to manufacture bag plugs may result in the development of slow leaks upon inflation of the bag plugs. The leak cause has been found to be the wicking action set up by the fiber configuration in the fabric material utilized. The fiber configuration itself, therefore, creates escape paths along the fibers of the fabric material to permit air from the interior of the plug to leak from the inflated plug body. Therefore, it has been found difficult and costly to consistently manufacture a prior art plug that prevents leakage at the fabric edges upon the inflation of the plug due to the air channels that form in the fabric weave. The structure and method steps of the present invention are provided so that the shortcomings of the prior art are overcome.

The present invention differs from the prior art in its structure, its method of assembly, as well as in the materials used in its manufacture. The plug body of the present invention is preferably manufactured using a plug body fabric portion, although multi-portion body configurations may be manufactured in accordance with the teachings of the invention to provide leak resistant plugs. The utilization of rectilinear flexible portions and sealing strips in the bag plug of this invention provides a means to assembly a plug with less stringent tolerances than those required in the assembly of prior art devices.

An adhesive, and preferably a contact adhesive, is used to bond the fabric to form the plug body, and importantly, capping strips are bonded over both the interior and exterior seams of the plug body. The cap strips are bonded in a manner to cover all fabric edges to prevent the leakage caused by the air channels set up in the fabric weave upon plug inflation. The materials of construction and method of assembly of the present invention result in a leak resistant, inflatable fabric plug device that may be constructed in an efficient and consistent manner. The resultant plug structure overcomes the difficulty and shortcomings of the prior art devices.

The object of the present invention is to manufacture an inflatable fabric bag plug that is leak resistant and suitable for use in low-pressure pipelines. It is also an object of this invention to provide a light-weight, foldable, easy to handle, inexpensive to manufacture fabric bag plug which is usable in low pressure pipelines and which is accessible through small access ports. A further objective of the present invention is to provide a manufacturing process so that a leak resistant plug may be consistently produced.

SUMMARY OF THE INVENTION

The present invention relates to an inflatable fabric bag structure and the method of consistently manufacturing leak resistant, inflatable fabric bag plugs. The method includes scribing and cutting plug body portions and end seam cap strips from a predetermined coated fabric. Further, seam cap strip materials of a specified material are provided for the manufacture of the plug. A tubular plug body is created by bonding two edges of the plug body portion together. The main seam cap strips are bonded to the top and bottom of the main seam. The end edges of the plug body portion are bonded together to form end seams in substantially flat end closures. An end seam cap strip is bonded over each end seam of the plug body. The cap strips are utilized to cover all fabric edges, both internal and external of the plug body, to prevent leakage caused by air channels in the fabric weave upon inflation of the fabric bag plug body.

Further, the present invention provides selected fabric materials and adhesives for producing leak resistant fabric bag plugs. The flexible fabric utilized for the bag plug, i.e., nylon coated fabric, allows for expansion (i.e., 10%) so that use of the plug in varying pipeline structures can be accommodated. Also provided are method steps for assembling fabric bag plugs having a by-pass assembly, inflation and pressure gauge assemblies and tethering assemblies for manipulating the bag plugs in a pipeline.

These and other benefits of this invention will become clear from the following description by reference to the drawings.

DESCRIPTION OF THE PREFERRED EMBODIMENTS

FIGS. 1–4 show the fabric bag plug 10 in an inflated state, whereas FIGS. 5–11 show the fabric bag plug 10 in a deflated state. FIGS. 12–15 show an alternate embodiment generally shown as plug 11, wherein a bypass assembly is mounted to and through the plug body 18.

The fabric bag plugs of this invention may be constructed in a range of sizes to thereby seal pipelines in a range of diameters. For example, the fabric bag plugs may be constructed to seal pipeline diameters ranging from approximately 6 inch to 144 inch diameters. To provide proper sealing and frictional requirements, the larger the diameter of the plug, the body length of the plug is accordingly longer in length. The back pressure holding capability of the bag plugs of this invention is generally inversely proportional to the plug body diameter.

Figure 1:
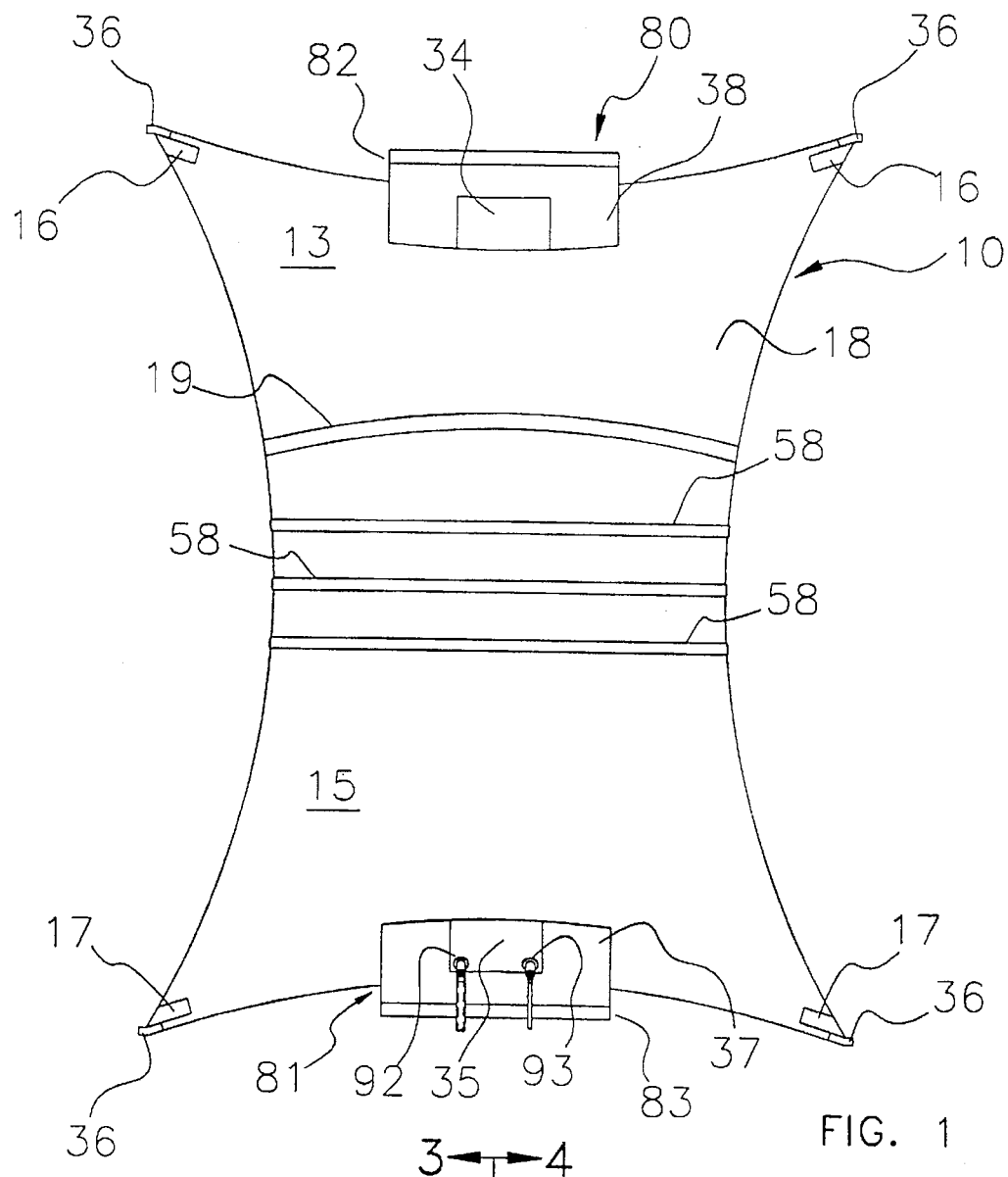
FIG. 1 is a top plan view of an inflated fabric bag plug in accordance with the teachings of the present invention.
Figure 2:
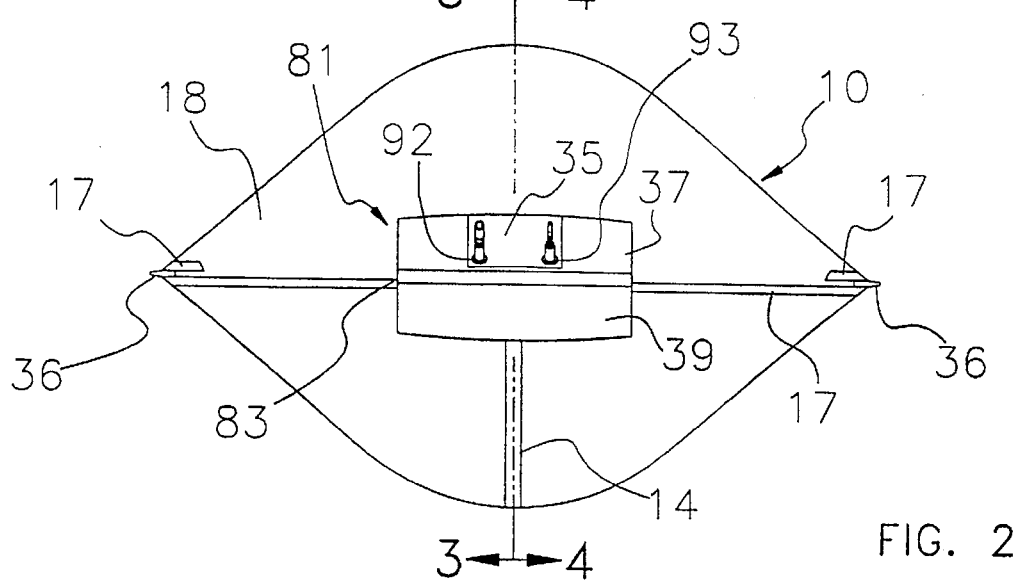
FIG. 2 is an end view of the inflated fabric bag plug of FIG. 1.

As shown in FIGS. 1 and 2, the fabric bag plug 10 has a plug body 18 which is comprised of a first body portion 13 and a second body portion 15 and which are circumferentially united at a location shown covered by the body seam cap strip 19. The plug body 18 has a main seam cap strip 14 wherein a generally rectilinear sheet of flexible material has been joined to form a tubular configuration. It is within the purview of this invention to have a seamless tubular structure and to have a plug body 18 composed of a single body portion.

The fabric bag plug 10 has opposing ends which are comprised of bonded and folded over body portion ends which are sealed by first and second end seam cap strips 16 and 17. Shown circumferentially disposed about the midsection of the plug body 18 are three sets of sealing ribs 58 which engage the interior surface of a pipeline. Shown bonded to the opposing ends of the plug body 18 are first and second tethering assemblies 80 and 81. The tethering assemblies 80 and 81 are utilized for attachment to cables or the like for maneuvering and positioning the bag plug 10 within a pipeline.

The tethering assembly 80 has a first tether patch 38 optionally a reinforcement patch 34 and a tether attachment tube 82 which is bonded within the tether patch. The tethering assembly 81 has a second tether patch which is a unitary member having panels 37 and 39. The first tether patch 38 being similarly configured. The second tether patch 35 also has a tether attachment tube 83 fixed at the folded end for purposes described above. Bonded onto the tether patch panel 37 is a casting reinforcement patch 35 through which ports 92 and 93 are mounted. The ports 92 and 93, as will be further described, are constructed and arranged to respectively receive inflation means and a pressure gauge for operating the fabric bag plug 10. Shown at the four corners of the plug body 18 are wear strips 36 which comprise strips of flexible material which are folded and bonded to the respective outside corners of the plug body 18 for protection against damage and wear as the plug 10 is maneuvered in a pipeline.

Figure 3:
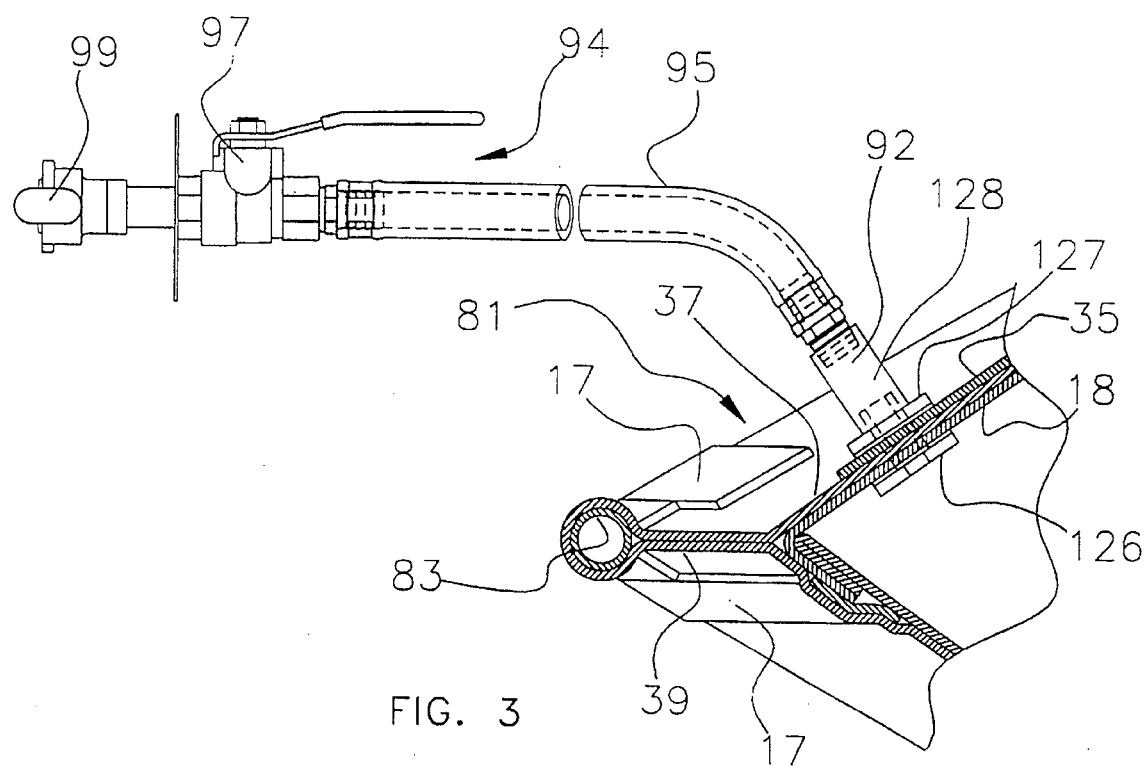
FIG. 3 is a sectional view taken along line 3—3 of FIG. 2.
Figure 4:
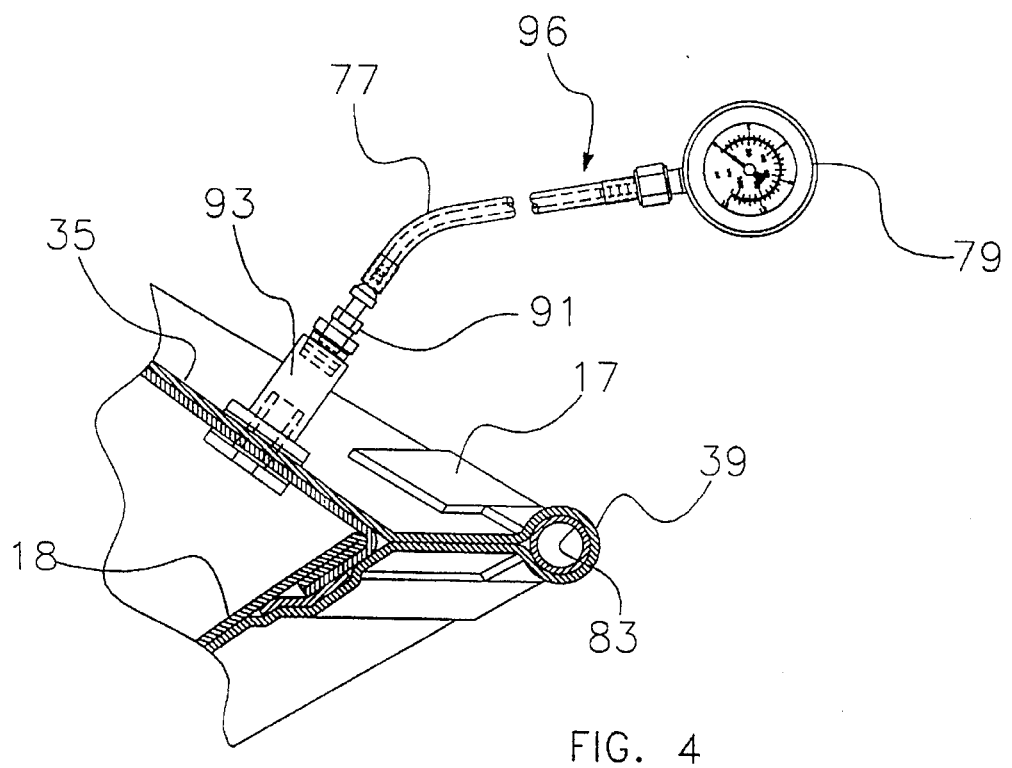
FIG. 4 is a sectional view taken along line 4—4 of FIG. 2.

Referring to FIG. 3, the end of the plug body 18 is shown in detail and particularly shows the tethering assembly 81 and the mounted port 92 to which an inflation assembly 94 is attached. The inflation assembly 94 is shown to comprise a hose 95, a valve 97 and a coupling/inflator 99 to which a compressed air source may be connected, for example. As also shown, the port 92 is comprised of a threaded bulkhead 126, a washer 127 and a coupling 128 which are sealingly attached to and through the flexible layers of 35, 37 and 18. FIG. 4 shows port 93 having a gauge assembly 96 attached thereto. The gauge assembly 96 is comprised of a snifter valve 91, a hose 77 and a pressure gauge 79. The assembly 96 is provided so that the pressure of bag plug 10 may be monitored during inflation and use. The port 93 is shown sealingly attached to the plug body 18 in the same manner as the port 92.

In summary, FIGS. 1–4 show an inflatable fabric bag plug 10 constructed of a plurality of coated fabric portions and sealing or cap strips. The fabric bag plug 10 includes a plug body portion 12, an exterior main seam cap strip 14, and first and second end seam cap strips 16 and 17. The plug body 18 is formed from united plug body portions 13 and 15. The plug body 18 is shown to have a body seam cap strip 19 and a main seam cap strip 14. As will be further described, the interior seams of the bag plug body 18 are similarly sealed with cap strip members.

Figure 5:
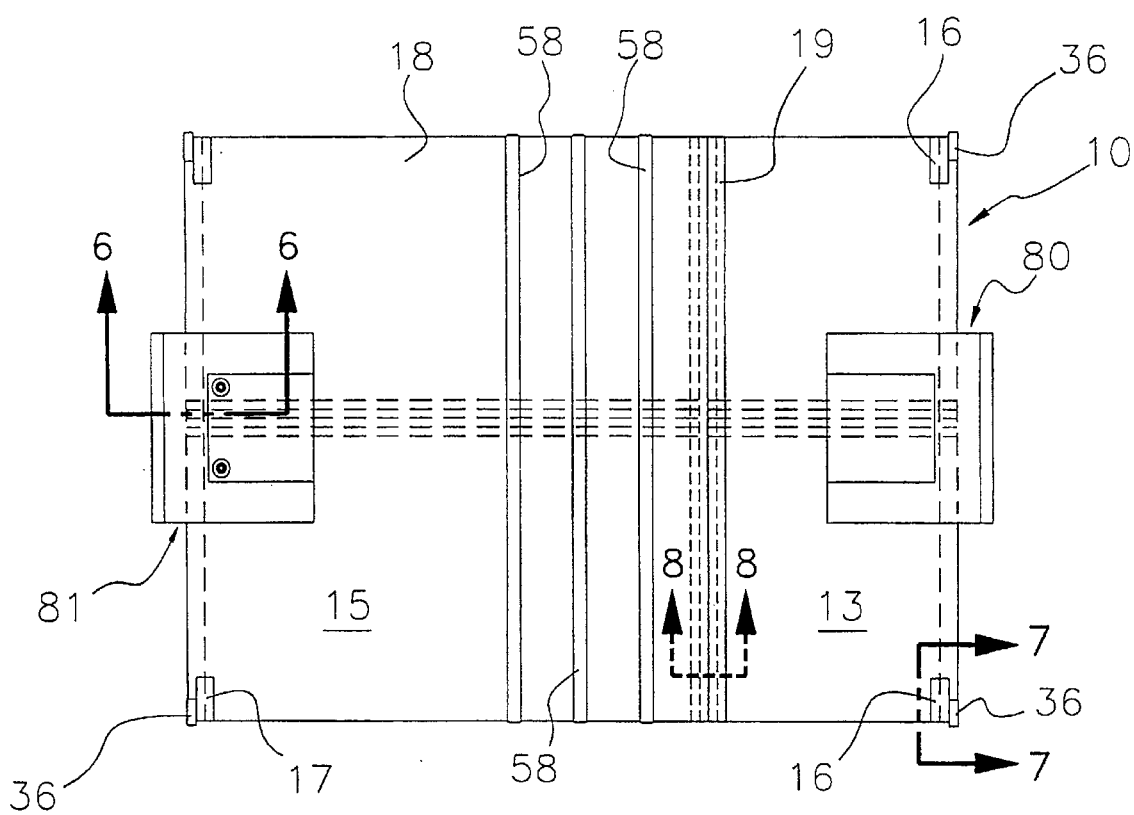
FIG. 5 is a top plan view of the fabric bag plug of FIG. 1 in a deflated state.

FIGS. 5–11 show the inflatable bag plug 10 in its deflated state. As shown, the bag plug 10 is comprised of a plurality of rectilinear portions and strips and when inflated forms a pillow like configuration as shown in FIGS. 1 and 2. FIG. 5 is a top view of the bag plug 10 and showing the first and second body portions 13 and 15, the outside body seam cap strip 19, the sealing rib extrusions 58 mounted thereon, the first and second end seam cap strips 16 and 17, the body corner wear strips 36 and the first and second tethering structures 80 and 81. Importantly, the width of the tethering structures 80 and 81 is dependent upon the width of the plug body 18. It has been found that the width, or the dimension along the end of the tether structures 80 and 81 be within a range of 25–40% of the plug body width. This dimensional range has been found to enable the tethering structures 80 and 81 to suitably distribute pulling forces without damage to the plug body 18 and without diminishing the maneuverability of the plug 10 within a pipeline.

Figure 6:
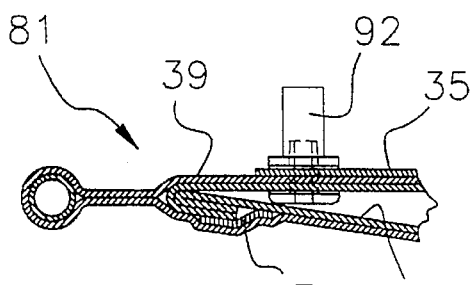
FIG. 6 is a sectional view taken along line 6—6 of FIG. 5.
Figure 7:
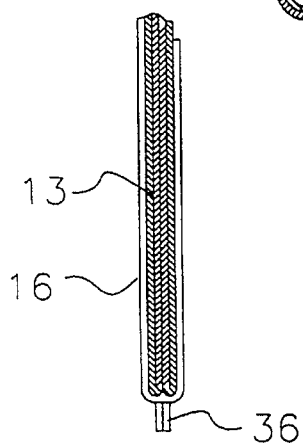
FIG. 7 is a sectional view taken along line 7—7 of FIG. 5.
Figure 8:
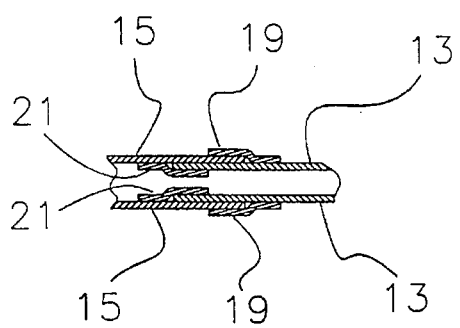
FIG. 8 is a sectional view taken along line 8—8 of FIG. 5.

FIG. 6 is a sectional view showing the attachment of the second tethering structure 81 to the plug body end. Further shown is the sealed plug body end configuration having the seam cap strip 17 covering the bonded and folded over plug body end. FIG. 7 is a sectional view of the plug body corner and showing the folded and bonded body end, the seam cap strip 16 and wear strip 36. FIG. 8 is a sectional view showing the bonded plug body portions 13 and 15, as well as the inside body seam cap strip 21, and the outside body seam cap strip 19.

Figure 9:
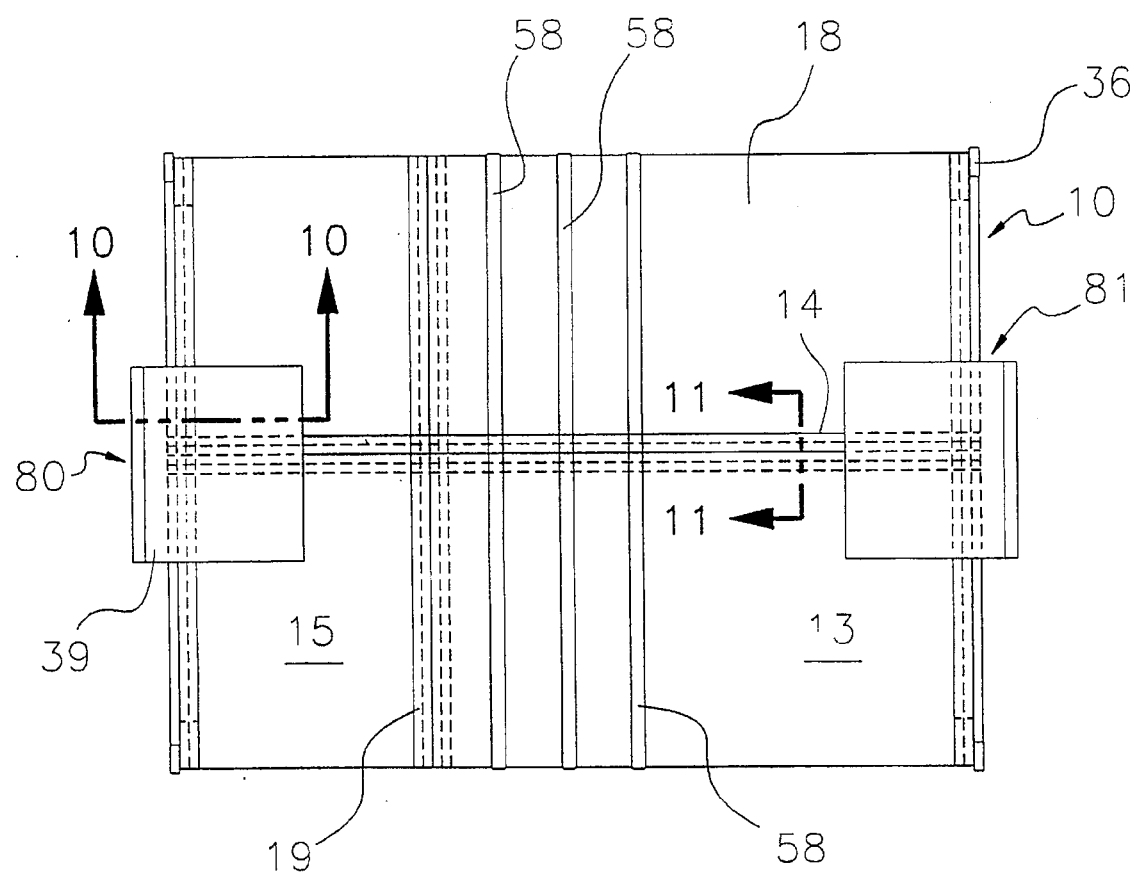
FIG. 9 is a bottom plan view of the fabric bag plug of FIG. 5.
Figure 10:
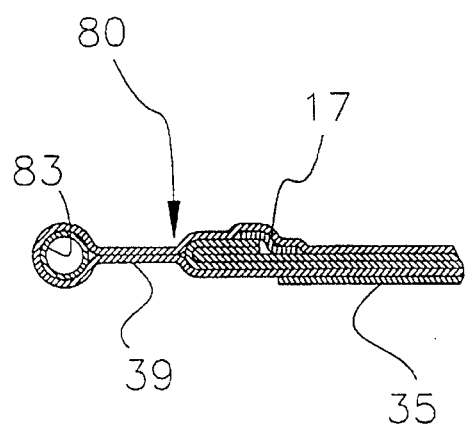
FIG. 10 is a sectional view taken along line 10—10 of FIG. 9.
Figure 11:
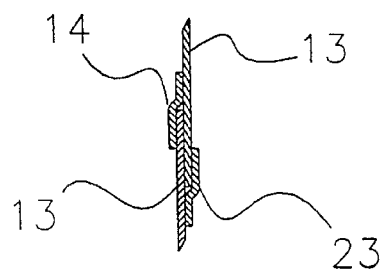
FIG. 11 is a sectional view taken along line 11—11 of FIG. 9.
Figure 12:
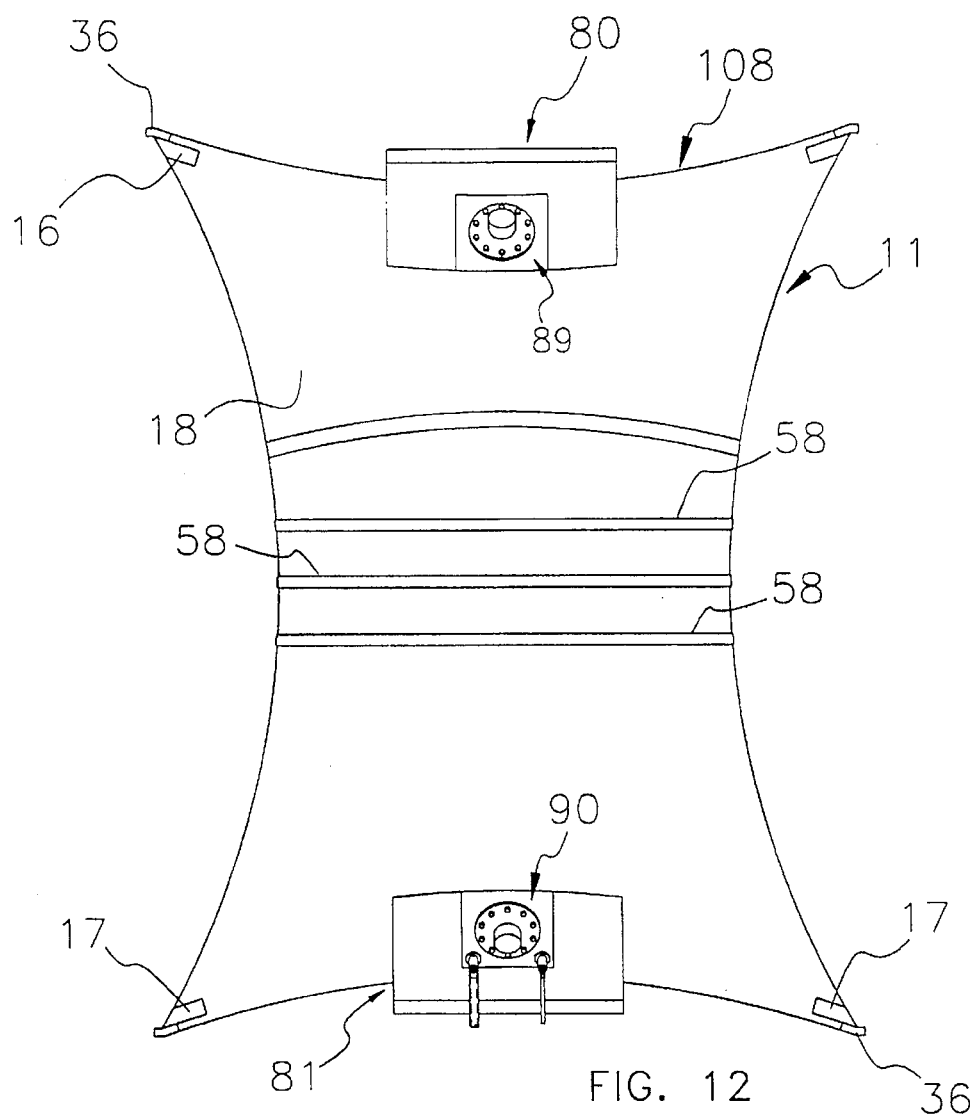
FIG. 12 is a top plan view of an alternate embodiment of a fabric bag plug in an inflated state.
Figure 13:
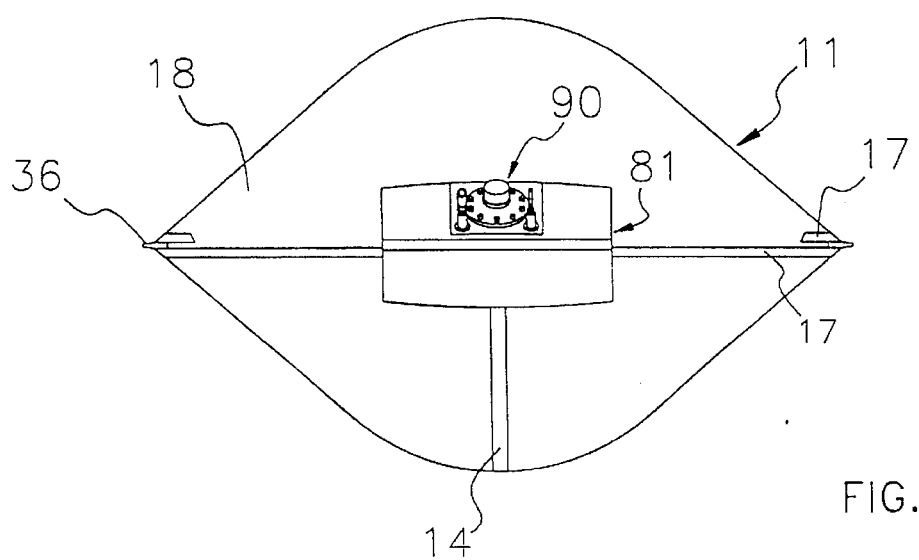
FIG. 13 is an end view of the fabric bag plug of FIG. 12.

FIG. 9 is a bottom view of the fabric bag plug 10 and showing the outside main seam cap strip 14 and the attachment of the tethering structures 80 and 81. FIG. 10 shows a sectional view of the main seam of the plug body.

Figure 14:
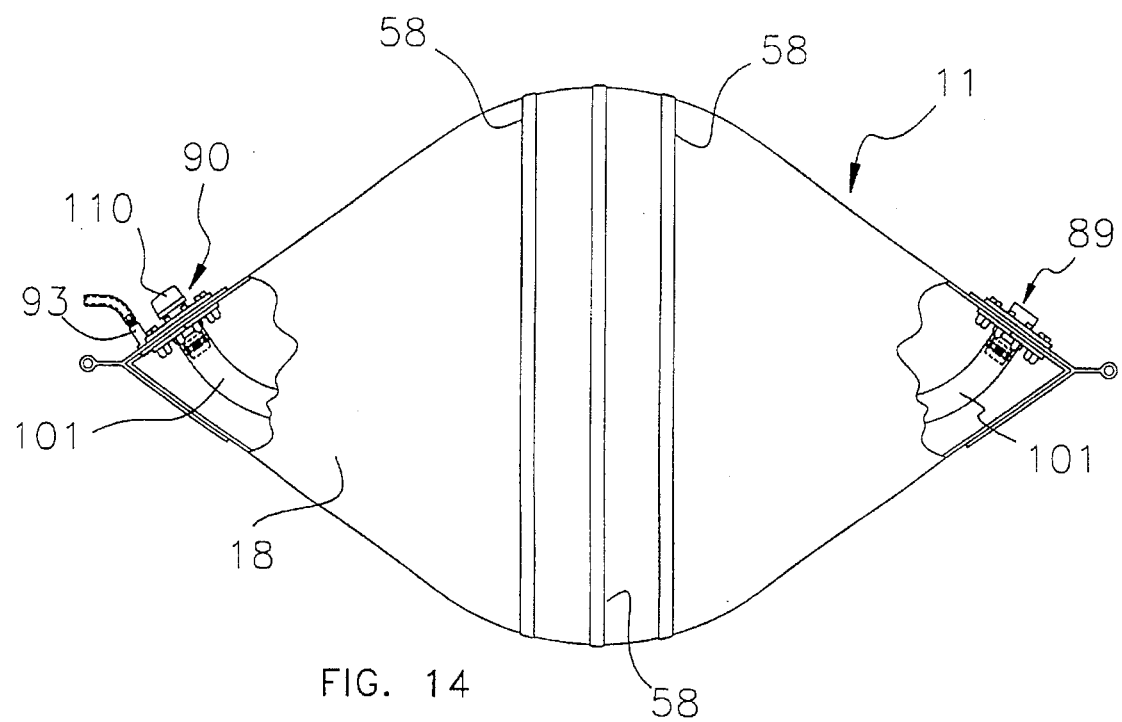
FIG. 14 is a side plan view of the fabric bag plug of FIG. 12.
Figure 15:
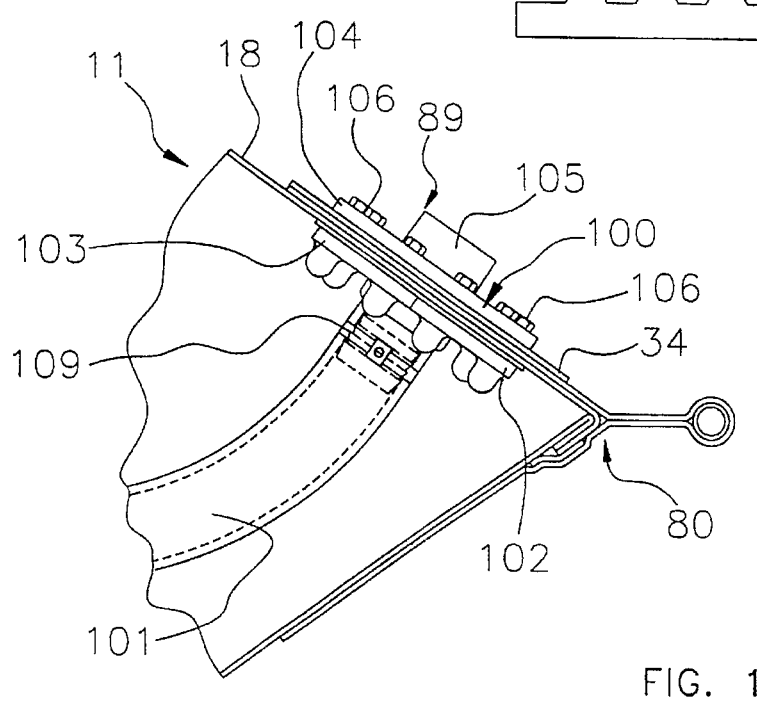
FIG. 15 is a sectional view of the fabric bag plug end of FIG. 14.

FIGS. 12–15 show the bag plug embodiment 11 which has a bypass assembly to permit fluids to pass therethrough while the plug is sealingly positioned in a pipeline. As shown, the plug body has a bypass assembly 89 installed at one end and a bypass assembly 90 installed at the opposite end. As shown in FIG. 14, a flexible hose 101 extends through the interior of the plug body 18 and connects the bypass assembly 89 to the bypass assembly 90. Bypass assembly 90 is further shown to have a cap 110. FIG. 15 is a sectional view of the bypass assembly 89. As shown, the assembly 89 is comprised of a casting member 100 and inside casting members 102 and 103. The inside casting member 102, 103 forms a split member which is connected to the outside member 100 by cap screws 106. Further shown, is the connection of the flexible hose 101 to the bypass port 105 by means of connector 109.

Figure 14A:
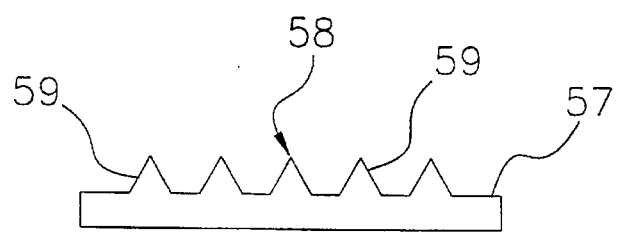
FIG. 14A is a sectional plan view of the sealing rib extrusion.

FIG. 14A is a cross-sectional view of one sealing rib extrusion 58 and showing a plurality of individual tapered sealing rib members 59 extending upwardly from the rib extrusion base 57. Thus, a variable combination of extrusions 58 and sealing rib members 59 may be utilized generally about the midsection of the plug. Preferably as shown, three such extrusions 58, each with five rib members 59 are utilized on the plugs, however, such use is dependent upon plug size.

It is important that the inflatable fabric bag plugs of the invention are light-weight, foldable, abrasion and puncture resistant, economical in structure and manufacture, leak resistant, flexibly expansible and capable of being tethered to withstand the usage pressures of a low pressure pipeline. The fabric utilized in the present invention is preferably of a nylon construction continuously coated on both sides with an elastomer, such as a urethane, PVC or the like. For example, such urethane coated nylon fabric preferably has a minimum tensile strength of 600 lbs/inch$^2$ and having a minimum coating adhesion of 25 lbs per inch$^2$. The cap strip material is preferably a clear polyurethane material having a thickness of 20 mil. The cap strip material has a predetermined width, for example 2 inches, and provided in roll form for metered use. The adhesive utilized in the construction of the plug is preferably a two part adhesive, for example having a polyurethane base. The activator utilized in conjunction with the adhesive is preferably a polysocyanate based activator.

In the preferred embodiment, an adhesive, and preferably a contact adhesive as set forth above, is utilized in the method of bonding the various elements of the plug to thereby form the inflatable fabric bag plug. However, it is anticipated that other bonding or adhesive compositions and related methods may also be used in accordance with the teachings of the present invention. A suitable contact adhesive is prepared, for example, by mixing a predetermined amount of polyurethane base adhesive with a predetermined amount of catalyst for a specified period. The adhesive mixture is preferably covered in its container when not in use to retard evaporation. Fabric surfaces to be bonded are preferably initially cleaned with a suitable solvent and allowed to dry. Such solvent is preferably comprised of toluene, acetone, heptane or the like. The adhesive is applied preferably with a roller 29 having suitable nap for proper adhesive retention and coverage. Other means of application may be used, such as a brush with suitable bristle retention. Optionally, a second adhesive coat is applied after the first coat has dried. The fabric surfaces are then mated and bonded within a specified time period after the adhesive has dried. A suitable solvent, such as MEK for example, may be utilized to rewet and reactivate the adhesive.

Figure 16:
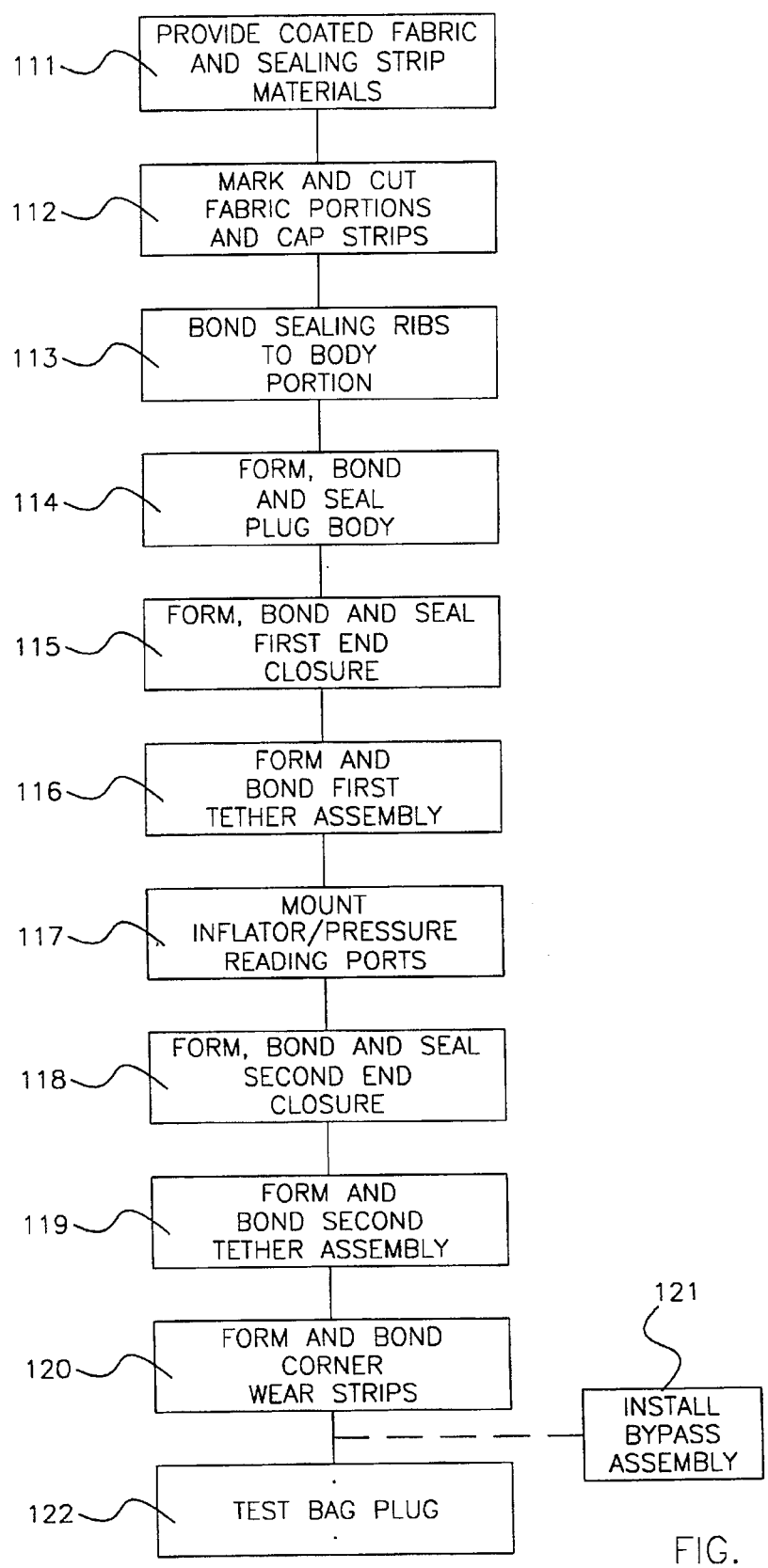
FIG. 16 is a flow diagram setting forth method steps for the manufacture of the fabric bag plugs of the present invention.

The assembly process steps for the inflatable fabric bag plugs 10 and 11 are set forth in FIG. 16. The process steps are further shown in FIGS. 17–23. The process steps set forth in the flow diagram of FIG. 16 show the preferred assembly steps, however, it is within the purview of the present invention to alter the sequence of those steps.

Figure 17A:
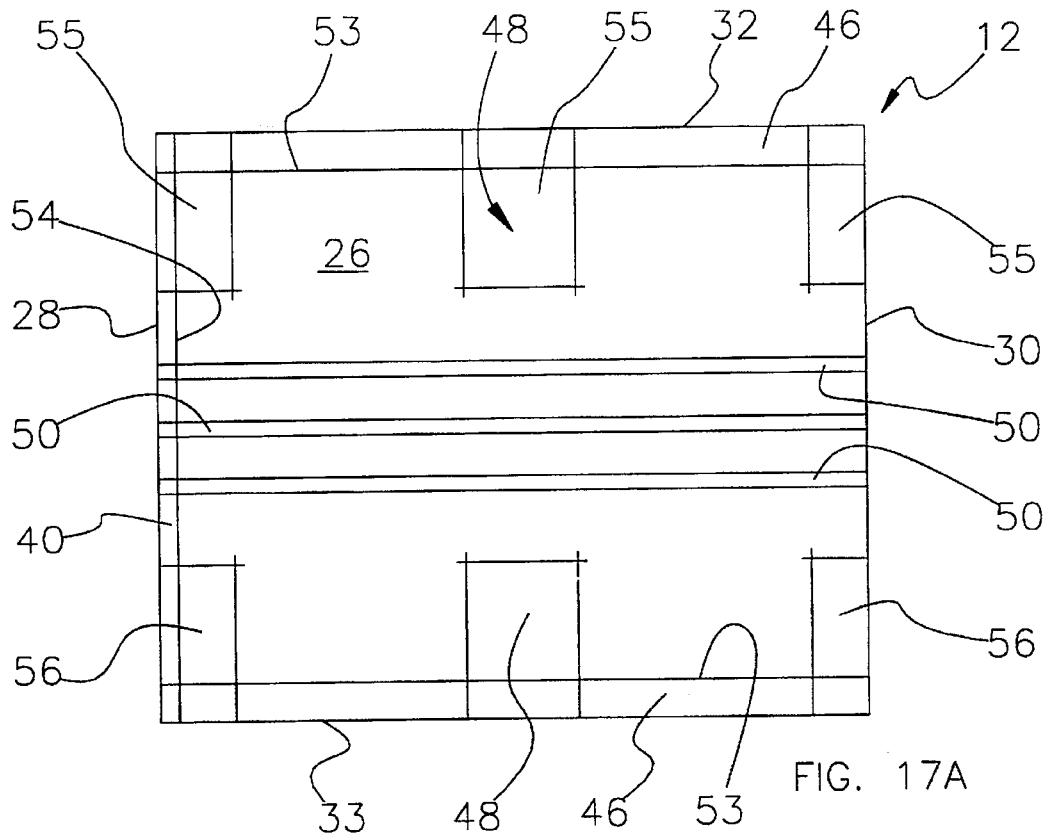
FIGS. 17A–17B show the steps of scribing the reference lines.
Figure 17B:
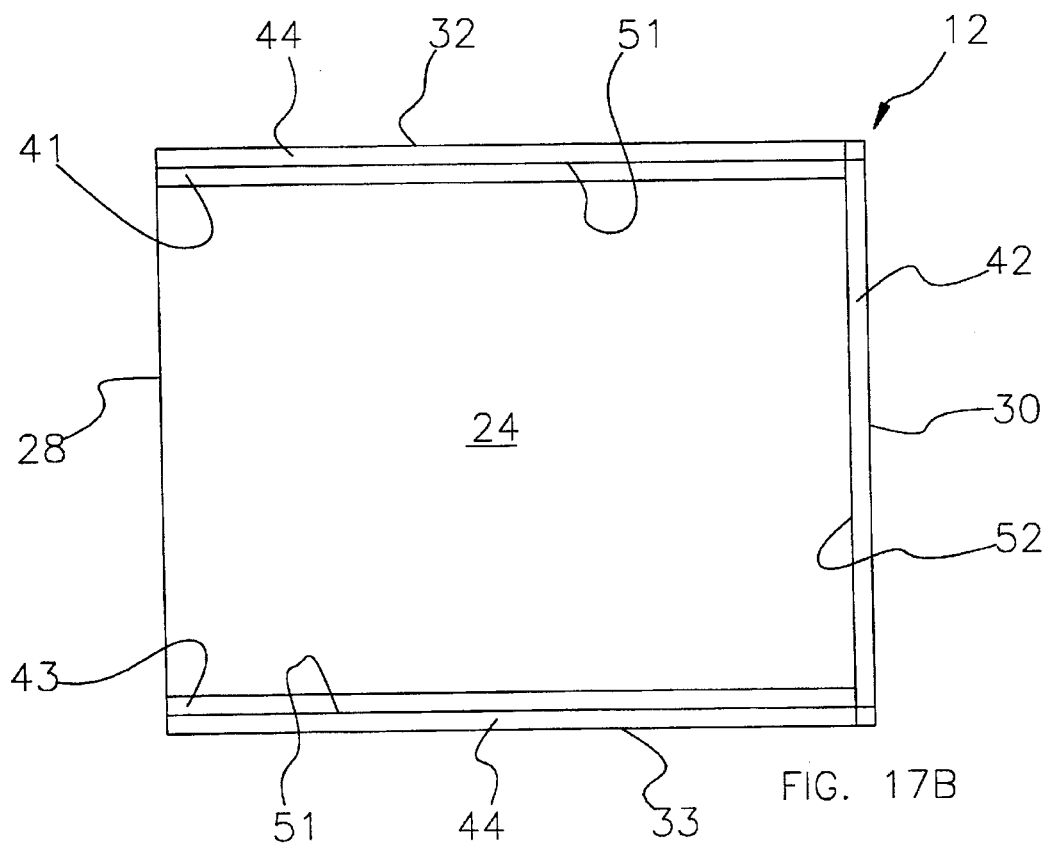

Referring to the process steps 111 and 112 of FIG. 16 and FIGS. 17A and 17B, a coated fabric material supply and a supply of sealing strip material is provided for use in the assembly process steps for the bag plugs 10 and 11. The coated fabric material is marked and cut to provide a plurality of fabric elements or portions, each portion having a predetermined dimension. The fabric elements include a plug body portion 12, as shown in FIGS. 17A and 17B, has an inside surface 24, an outside surface 26, a first main edge 28, a second main edge 30 and first and second end edges 32 and 33. First and second end seam cap strips 16 and 17 are cut slightly longer than the width of the plug body portion 12. In addition, first and second casting reinforcement patches 34 and 35, a set of four wear strips 36, and two tether patches 37 and 38 are optionally cut diagonally across the fabric to increase their strength, however, a normal directional cutting pattern has been found suitable. The fabric used for the plug body portion 12 and the casting reinforcement patch 34 is preferably urethane coated nylon.

The main seam cap strips 14 and 23 are cut slightly longer than the length of the plug body portion 12 and are subsequently trimmed. The fabric used for the main seam cap strips 14 and 23 is preferably 20 mil clear urethane. The utilization of the clear urethane material is its chemical and structural similarity with the coating of the nylon fabric material. Further, the clarity of the material permits the assembler to visualize the adhesive covering the various seams and to thereby ensure proper bonding and placement of the cap strips with respect to the seams to be covered.

Referring to process step 112 and FIGS. 17A and 17B, reference lines are marked or scribed on the plug body portion 12 using a suitable marker, such as a ball point pen, for example, to create the following: a first main margin 40; a second main margin 42; first and second end margins 44; first and second lap seam margins 46; first and second sets of tether patch areas 48; and sealing rib lines 50. The end margins 44 and the second main margin 42 are scribed on the inside surface 24. The end margins 44 are marked by scribing end lines 51 a predetermined distance, such as two inches, from the end edges 32. Importantly, adjacent and outside of the scribe lines 52, lengths of tape 41 and 43 is placed on the fabric so that the subsequent adhesive line is provided in a straight line whereby subsequent the removal of the tape segments the body seam is linear to uniformly distribute inflation forces within the completed bag plug body. The second main margin 42 is marked by scribing a second main line 52 two inches from the second main edge 30.

The first and second lap seam margins 46, the first main margin 40, the first and second set of tether patch areas 48, and the sealing rib lines 50 are scribed on the outside surface 26. The lap seam margins 46 are created by scribing lap seam lines 52 approximately four inches from the end edges 32. The first main margin 40 is created by scribing a first main line 54 two inches from the first main edge 28. The sets of tether patch areas 48 are created by scribing a first 55 and second 56 tether patch area of a predetermined dimension along the end edges 32. The first tether patch area 55 of each set is centered between the first main line 54 and the second main edge 30. The second tether patch area 56 of each set is centered on both the first main line 54 and the second main edge 30. The sealing rib lines 50 are scribed in an arrangement that will subsequently allow a plurality of rib extrusions 58 to be bonded to the plug body to thereby form sealing contact with the interior of a pipe or conduit when the bag plug is inflated.

As will be further discussed, the rib extrusions 58 may be cut to a predetermined size and bonded between the sealing rib lines 50 that are scribed on the outside surface 26 of the plug body portion 12. Referring to process step 113 and FIG. 18A, the rib extrusions 58 are bonded to the outside surface 26 of the body fabric portion. The rib extrusions 58 are preferably composed of a urethane composition to provide a suitable coefficient of friction with respect to the interior surface of a pipeline. The rib extrusions 58 are spaced and positioned at generally the mid-section of the plug body. The rib extrusions preferably have a Shore A durometer range between 50–60 although extrusions with a higher durometer reading have been found acceptable. The rib extrusions are utilized to seal the bag plug within and in conformance with any small irregularities in the pipeline surface.

Figure 18A:
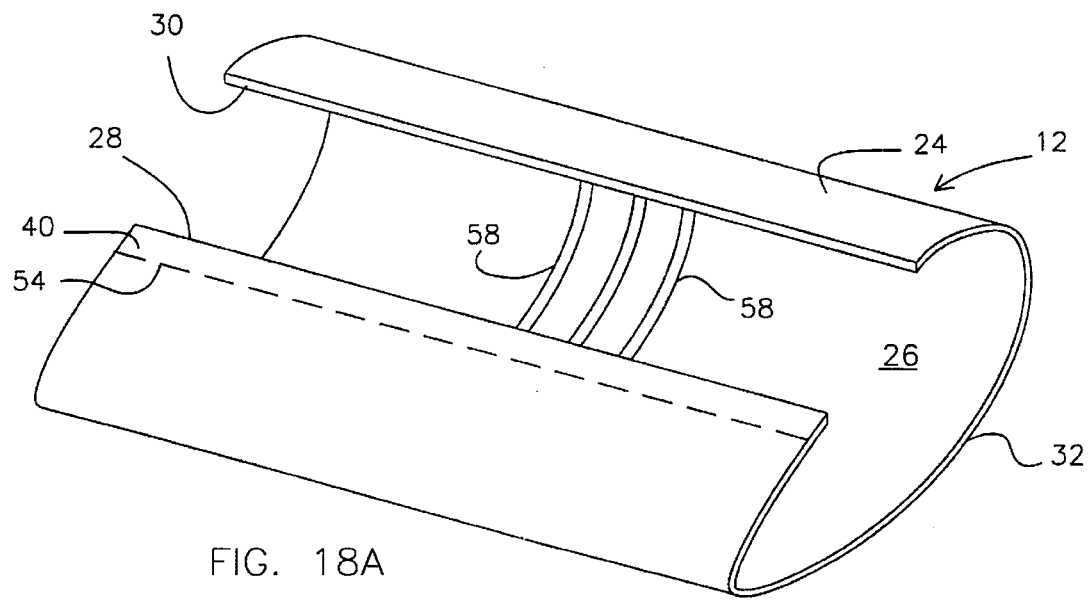
FIGS. 18A–18D show the steps of forming the plug body.
Figure 18B:
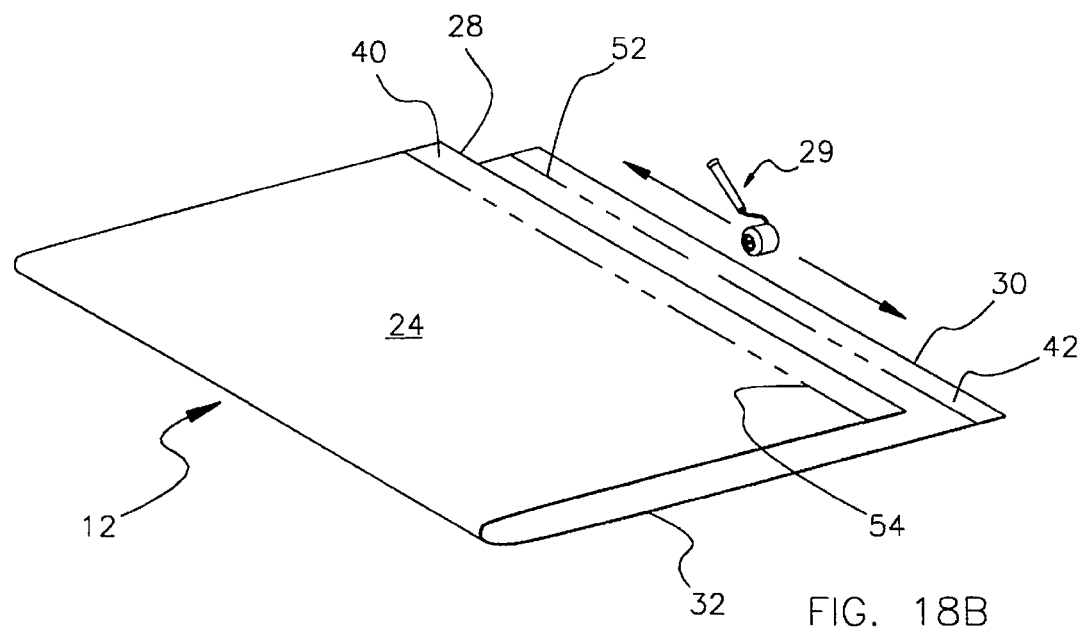
Figure 18C:
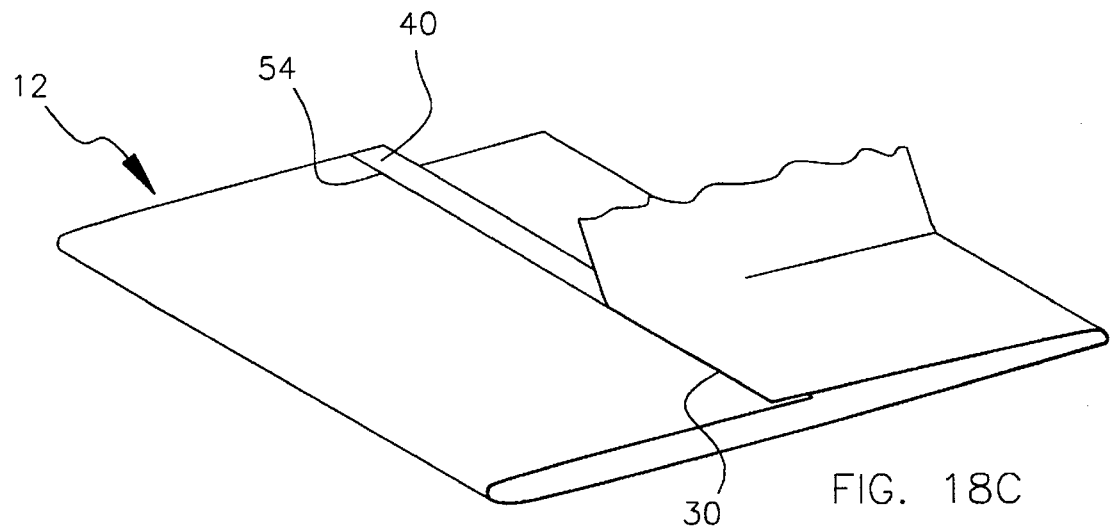
Figure 18D:
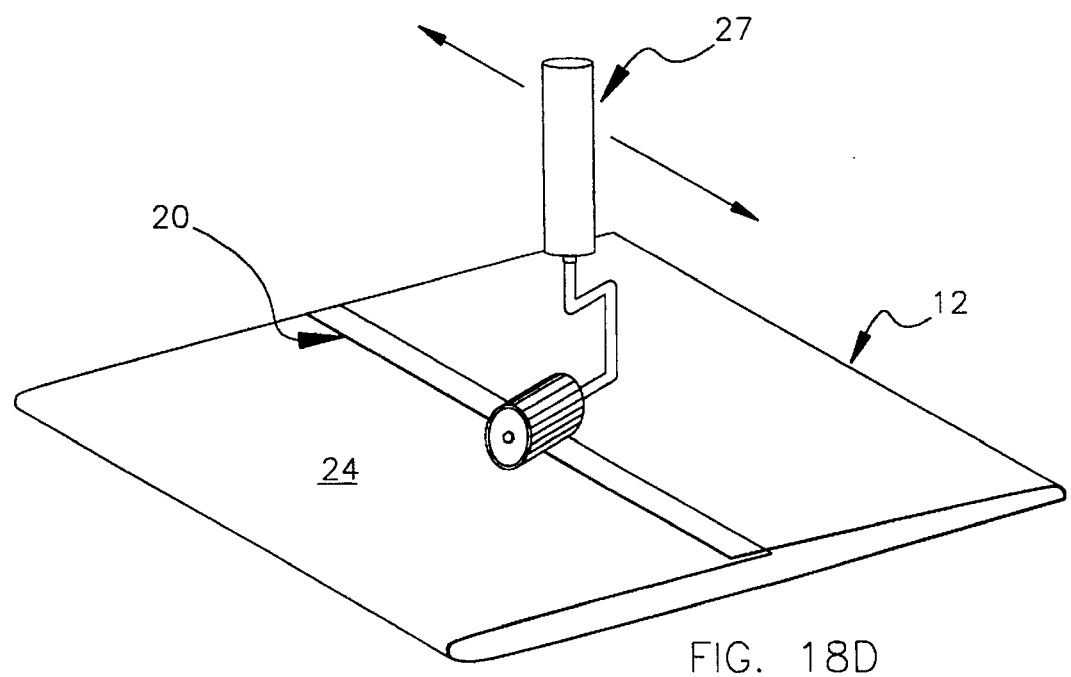
Figure 19A:
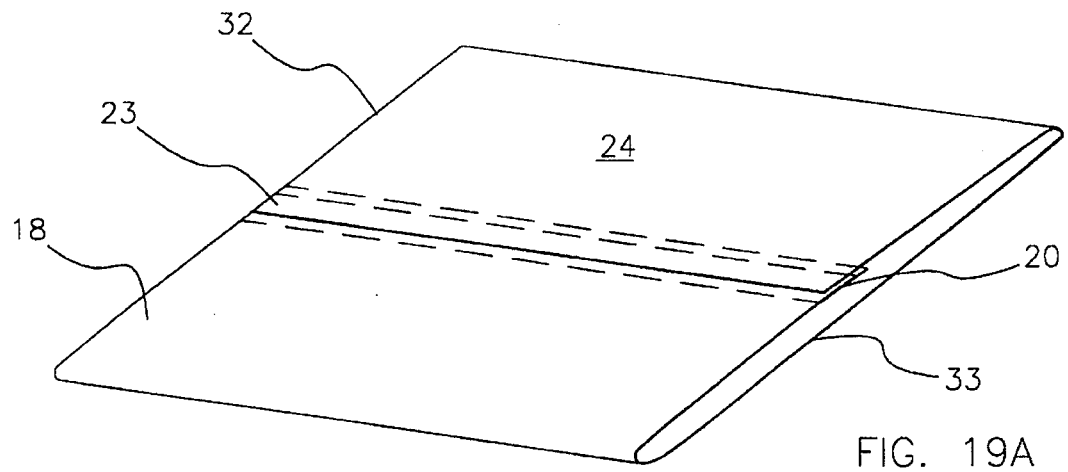
FIGS. 19A–19C show the steps of applying the main seam cap strips.
Figure 19B:
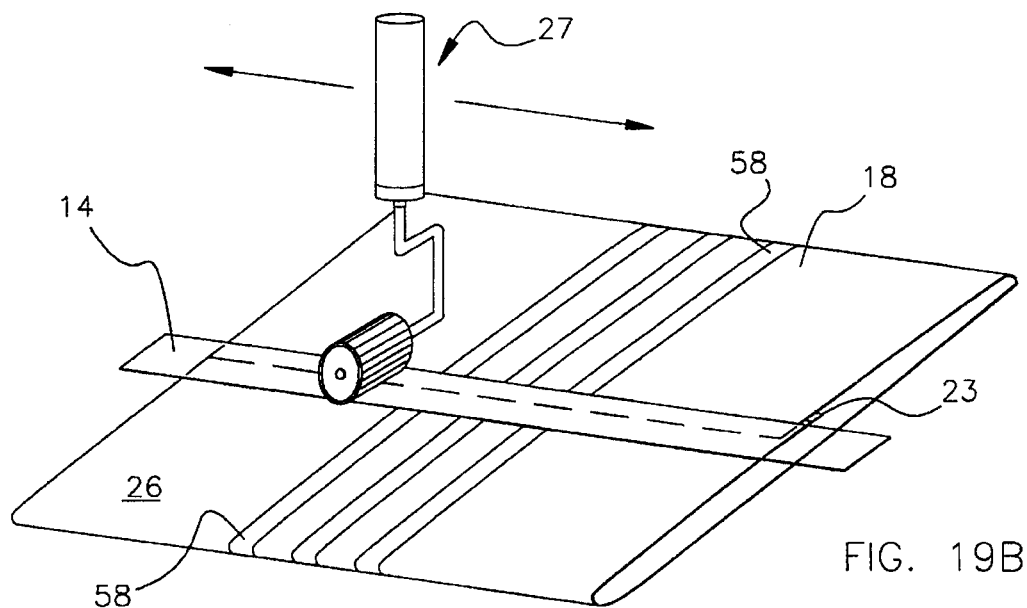
Figure 19C:
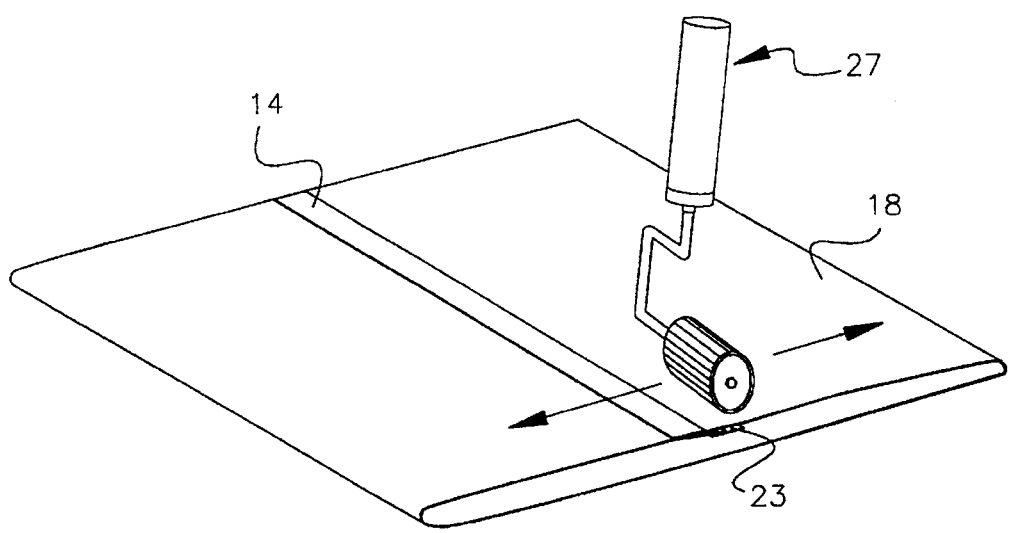
Figure 20A:
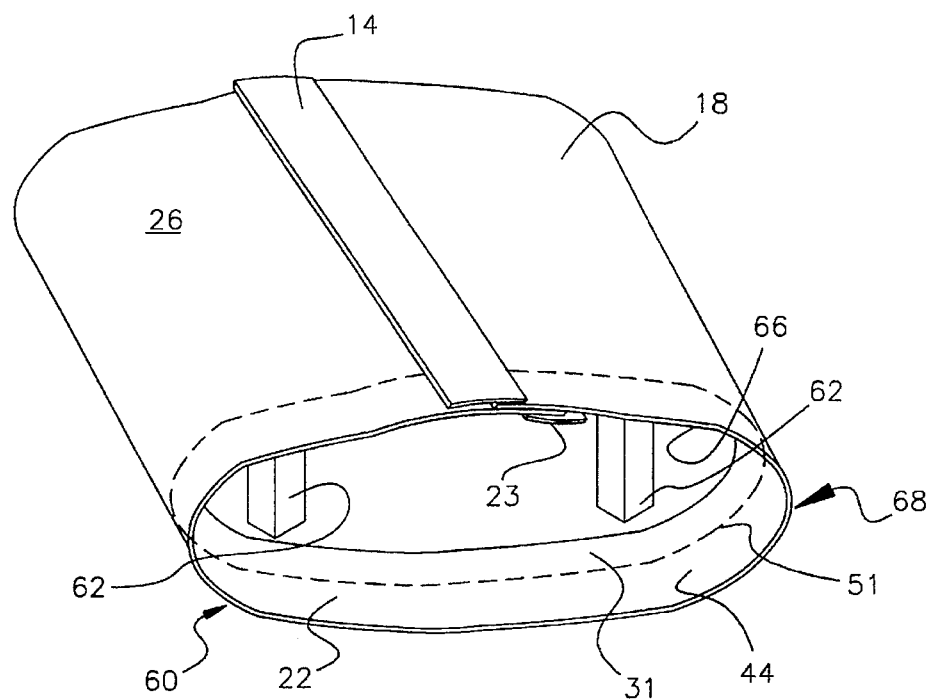
FIGS. 20A–20F show the steps of forming and sealing the end closures.
Figure 20B:
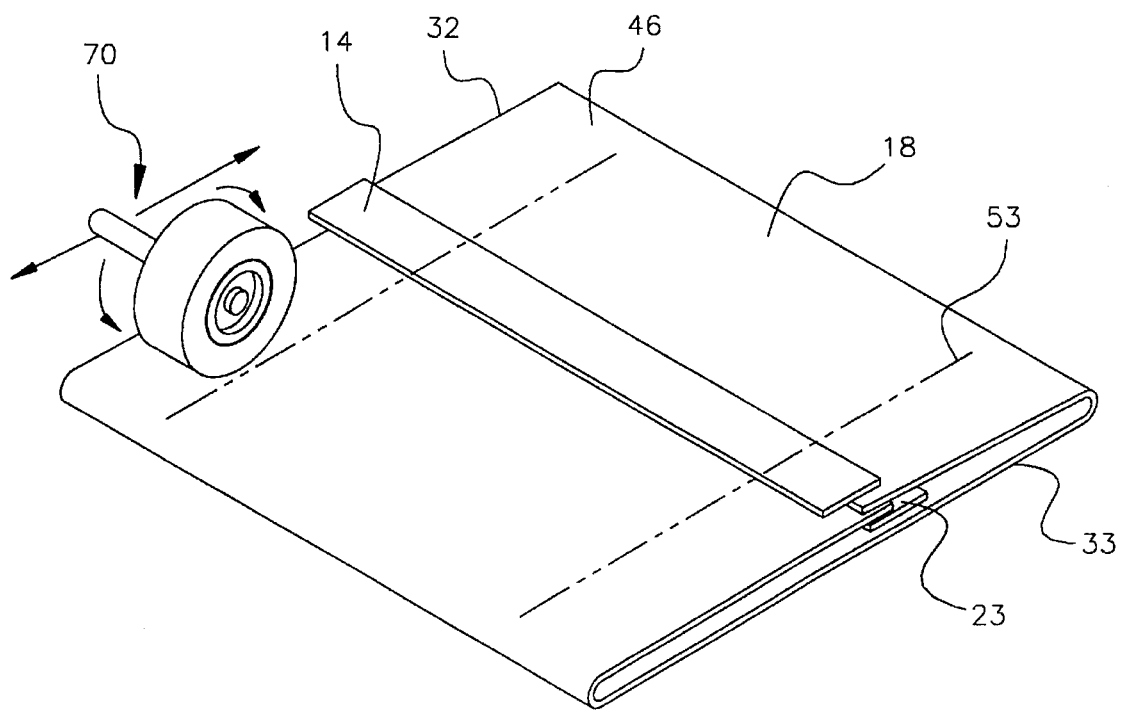
Figure 20C:
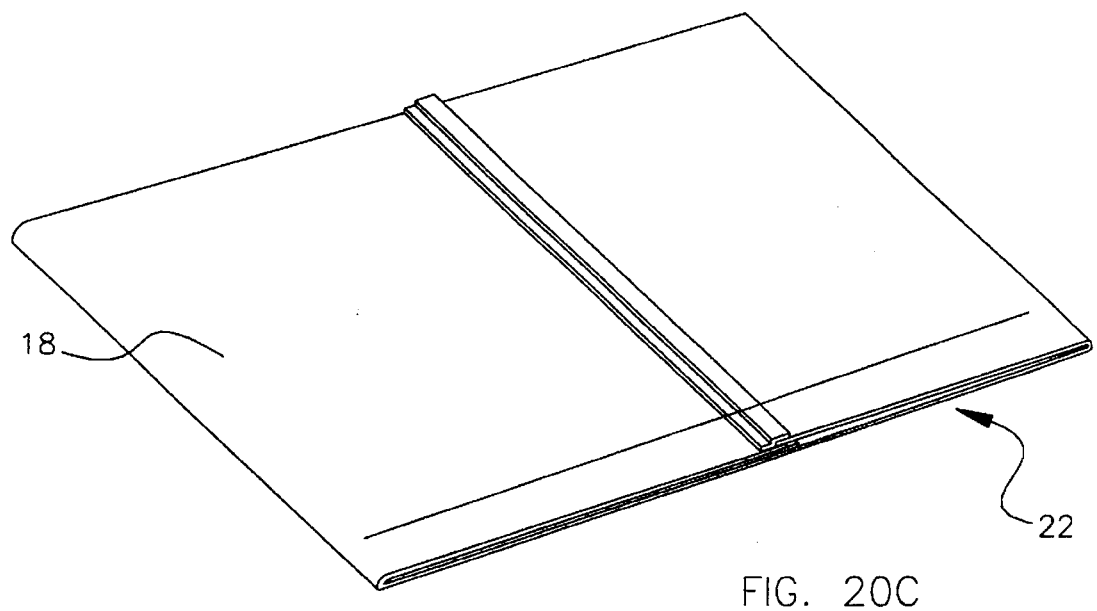
Figure 20D:
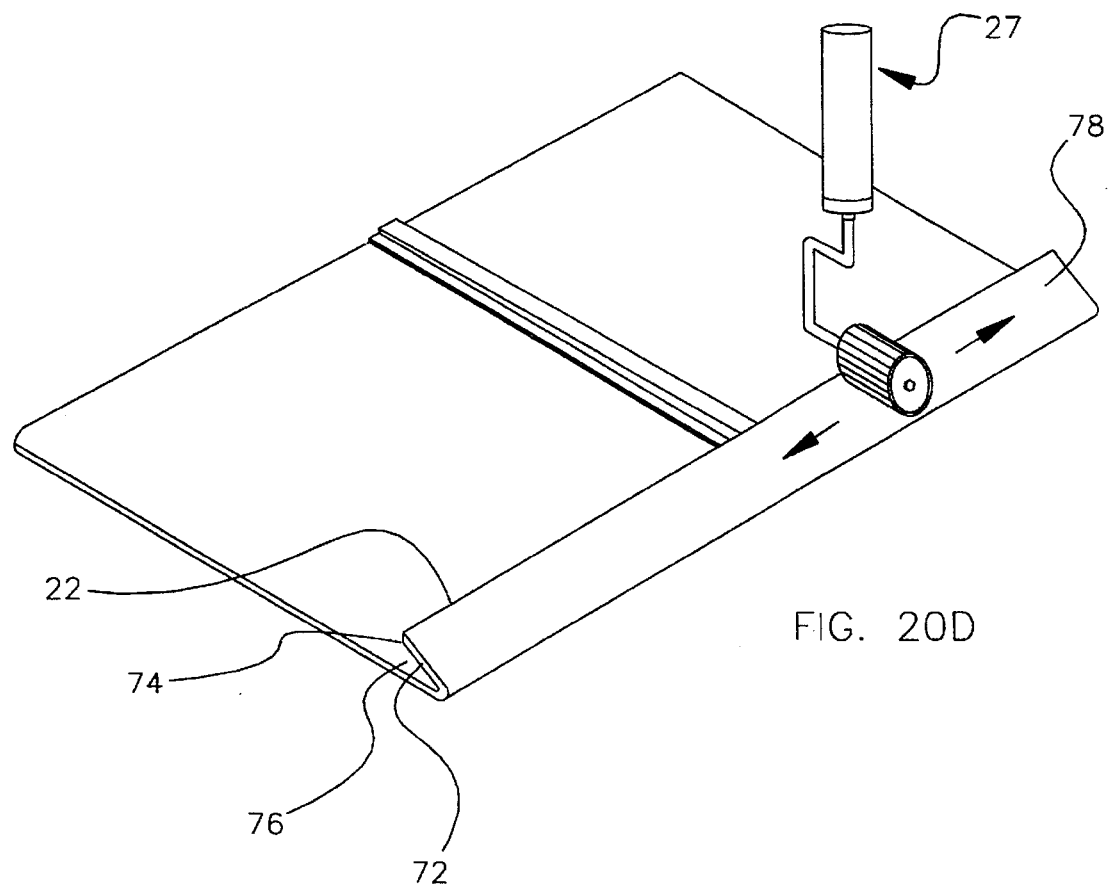
Figure 20E:
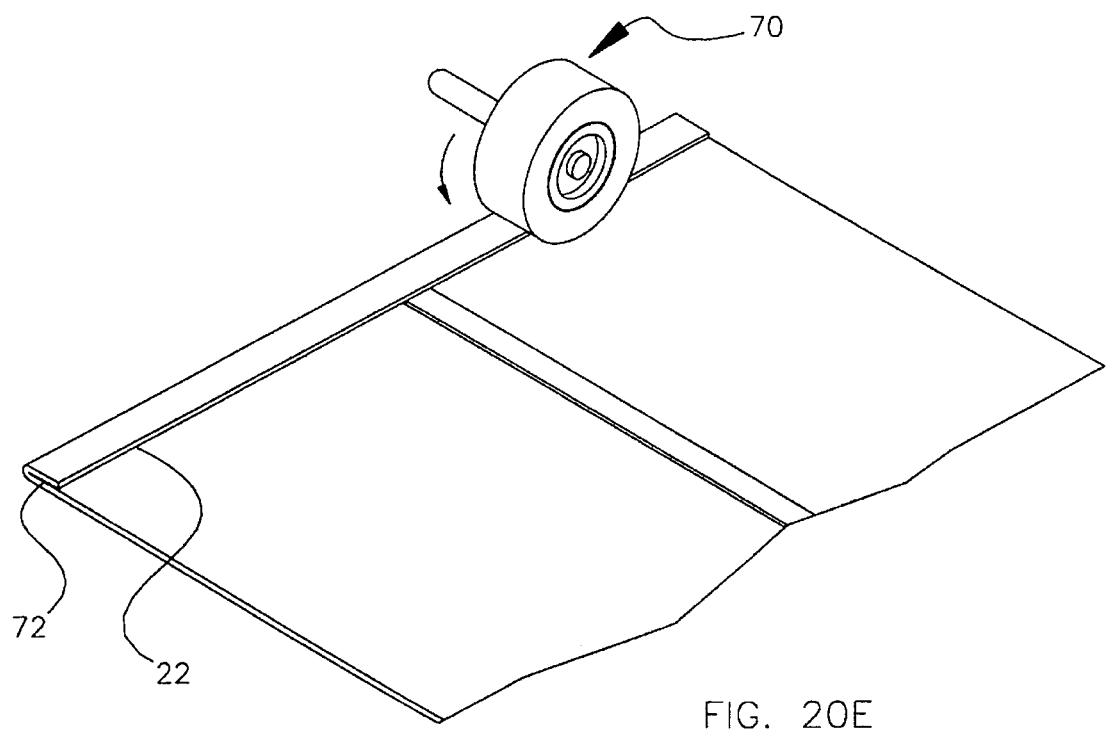
Figure 20F:
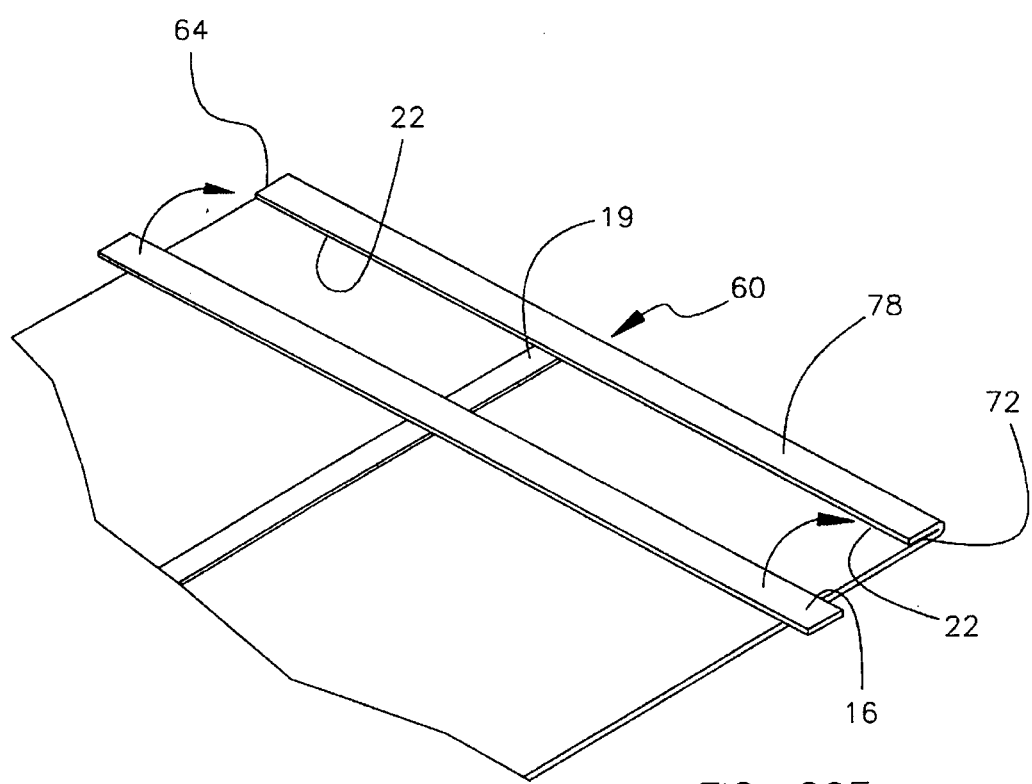

Referring to process step 114 and FIGS. 18A–18D, a tubular plug body 18 is created when the first 40 and second 42 main margins are aligned and bonded together to form a main seam 20. An adhesive roller 29 is used to apply adhesive to first main margin 40 and second main margin 42. As shown in FIG. 18D, a roller 27 is used to apply even pressure to the main seam 20 to insure a suitable bond. As shown in FIG. 19A, the main seam cap strip 23 is symmetrically bonded over the main seam 20. The main seam cap strip 23 is subsequently trimmed in a flush arrangement with the end edges 32. The plug body is now turned inside out to thereby place surface 26 to the outside and to expose the sealing ribs 58.

Referring to the process step 115 and FIGS. 20A–20F, a first end closure 60 is formed. As shown, the spacers 62 are positioned in the end of the plug body 18 to open or spread the body ends so that the adhesive may be easily applied to the fabric surface and subsequently dried. The main seam 20 is centered with respect to the plug body 18. The end margin 44 is flattened beginning from the main seam 20 and worked outward to the corner edges 64. The top end margin 66 is bonded to the bottom end margin 68. The end seam 22 is rolled out utilizing a high pressure roller assembly 70 (200–300 psi). High-force clamping devices are next used to press the first end closure 60 on each side of the main seam 20 for a specified time period. A lap seam 72 is formed by folding the lap seam margin 46 over itself starting at the main seam 20 and worked outward to the corner edges 64. The end edge 32 is aligned with the lap seam line 52, and the top 74 and bottom 76 interior surfaces of the lap seam 72 are then bonded together. The lap seam 72 is rolled out and may be clamped by the high-force clamping device for a specified time. The end seam cap strip 16 is bonded symmetrically over the end seam 22 and lapped over to the bottom surface 78. The end seam cap strip 16 is rolled out to provide a suitable bond. Thus, in addition to the roller structure 70, clamping structures are utilized for a specified time period to ensure a proper bond. For example, bar clamps are placed at the ends and the midsection of the plug end seam for approximately 15 minutes to bond the folded areas.

Figure 21A:
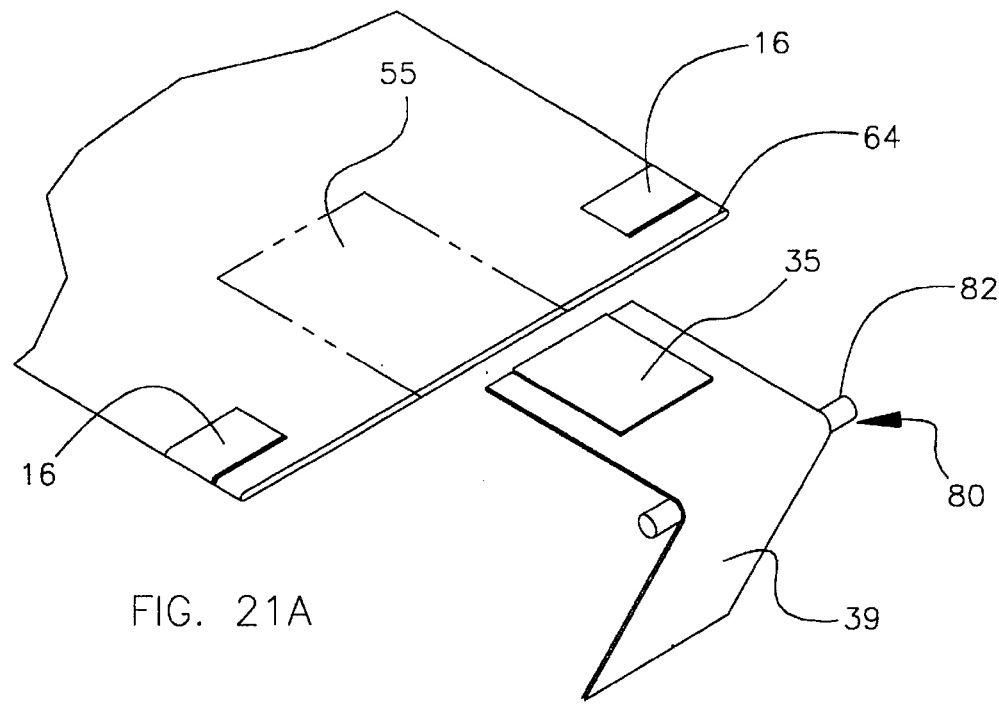
FIGS. 21A–21B show the steps of forming and attaching the tethering assemblies to the plug body.
Figure 21B:
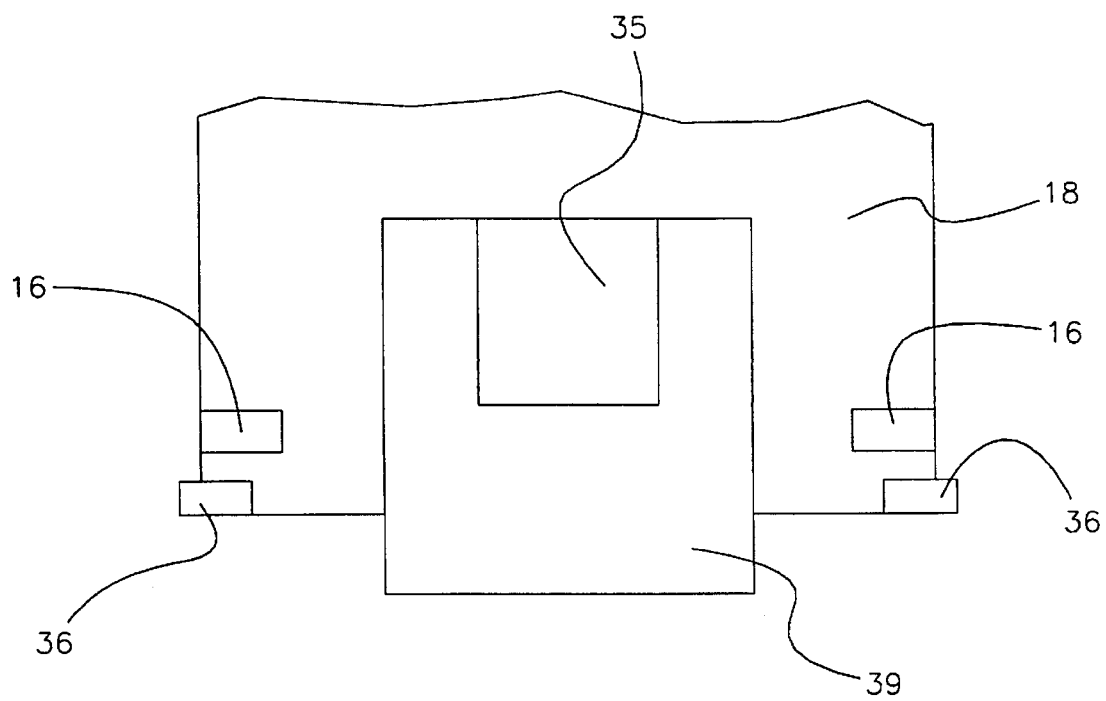

Referring to process step 116 and FIGS. 21A and 21B, a first tethering means 80 is formed and which is used for inserting and removing the plug 10 from a pipeline. A first tether attachment tube 82 is captured by the first tether patch 38. The first end 84 and second end 86 of the first tether patch 38 are then bonded to the first and second tether patch areas 48 of the first set. Referring to process step 120 and FIG. 21B, corner wear strips 36 are formed and bonded to cover the respective corners of the plug body 18. Each rectilinear member is folded and bonded over the plug body corner along the plug end extended beyond the sides. Wear strips 36 are next bonded to the corner edges 64.

Figure 22:
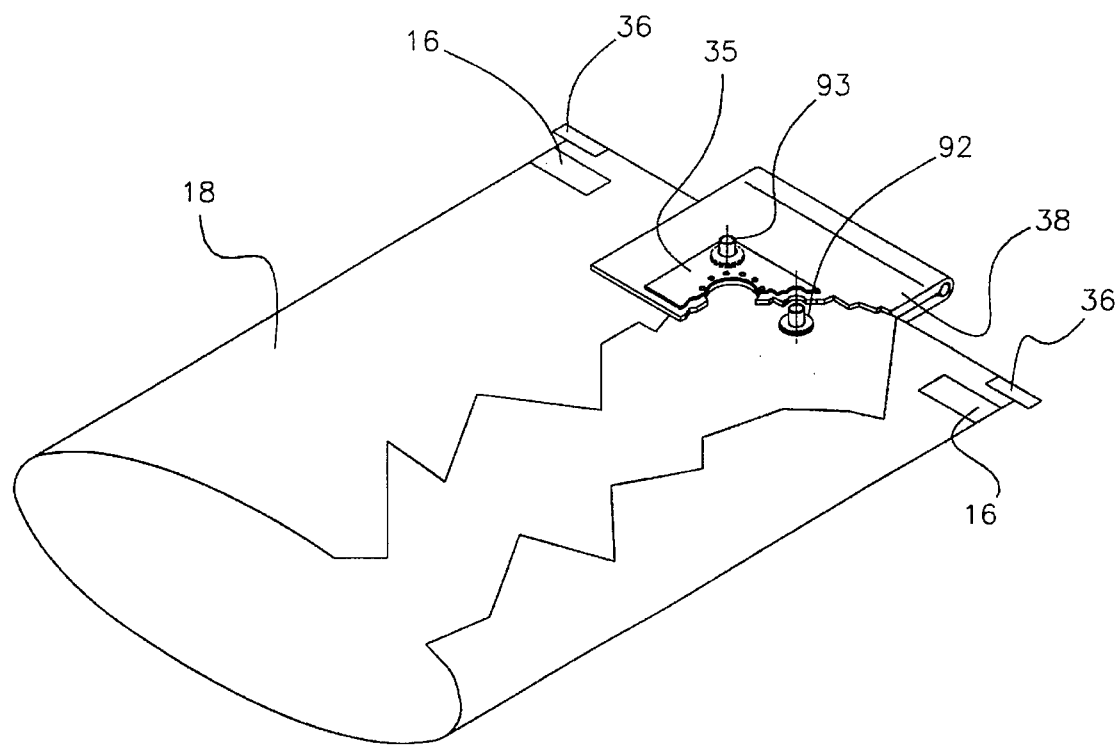
FIG. 22 shows the step of installing the inflation and monitoring ports to the plug body.
Figure 23:
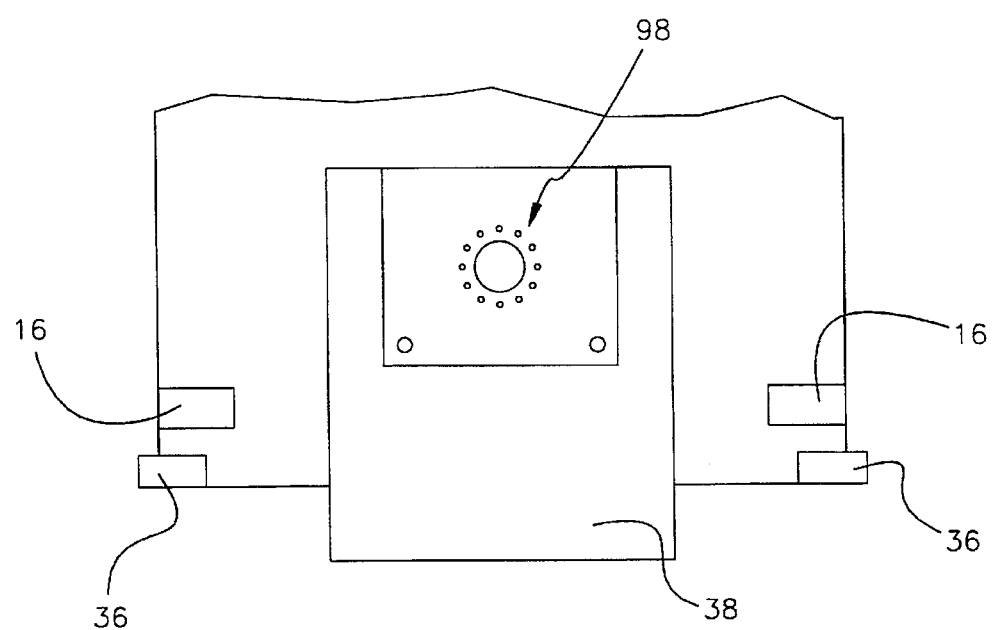
FIG. 23 shows the step of installing the bypass assemblies of the plug.

Referring to process step 117 and FIG. 22, a first casting reinforcement patch 35 is shown bonded to the first tether patch 38 which is bonded to the plug body 18. Ports 92 and 93 which are provided for receiving an inflation assembly 94 and gauge assembly 96 and are shown mounted on patch 35. Referring to process step 121 and FIG. 23 and FIG. 12, a bypass assembly 90 is installed. A mounting hole pattern 98 for a casting assembly 100 is then cut through the casting reinforcement patch 34, the first tether patch 38, and the plug body 18. The bypass assembly 90 consists of first and second casting assemblies 100 that are connected by a flexible hose 101. The casting assembly 100 has inside casting members 102, 103 and outside casting member 104, and a plurality of casting screws 106. The inside casting members 102 and 103 are inserted inside of the plug body 18 and are screwed to the outside casting member 104 through the mounting hole pattern 98. The casting screws 106 are preferably tightened to approximately seventy foot-pounds of torque. The inside casting members 102 and 103 for the second casting assembly 100 are preferably inserted into the plug body 18 before the second end closure 108 is formed.

Referring to process step 118, a second end closure 108 is formed in generally the same manner as that set forth with respect to first end closure 60 of process step 115 and shown in FIGS. 20A–20F, as discussed above. Referring to process step 119, a second tethering means 80 is bonded to the plug body 18 in generally the same manner as described with respect to process step 116 and FIGS. 21A and 21B, discussed above.

Referring to process step 121, a second casting reinforcement patch 34 is bonded to the second tether patch 38 which is bonded to the plug body 18. A mounting hole pattern 98 for a casting assembly 100 is then cut through the second casting reinforcement patch 34, the second tether patch 38, and the plug body 18. The outside casting member 104 is then screwed to the inside casting members 102, which forms a split assembly, through the mounting hole pattern 98, wherein the casting screws 106 are tightened to approximately seventy foot-pounds of torque. The split casting member 102 is utilized to permit the individual members to be easily manipulated with respect to the plug body for subsequent assembly.

Optionally, the rib extrusions 58 which are cut to a predetermined size may be bonded at this point to the sealing rib lines 50 which are scribed on the outside surface 26. The fabric bag plug 10 may be partially inflated so that the rib extrusions 58 can be bonded on a smooth surface. The rib extrusions 58 form a seal with the interior of a pipe and are composed of urethane.

Referring to process step 122, the inflatable fabric bag plug 10 is tested for leak resistance. The bag plug 10 is initially inflated to full inflation pressure within a pipeline section. Thereafter, the fabric bag plug 10 is deflated to 1 PSIG and all of the seams are bubble tested. Any leaks located are repaired using a bonding adhesive patching material composition. Alternatively, the adhesive mixture used to bond the bag plug may also be used for repair purposes.

As many changes are possible to the embodiments and methods of this invention utilizing the teachings thereof, the descriptions above, and the accompanying drawings should be interpreted in the illustrative and not the limited sense.

That which is claimed is:

1. An assembly process for a flexible bladderless bag plug comprising:
    (a) providing a plurality of flexible material portions, each said flexible material portions being of a predetermined construction and configuration, said flexible material including at least a first predetermined construction comprising a coated fabric material having exposed fabric ends, said coated fabric material being utilized to form a bladderless body of said flexible bag plug;
    (b) bonding said flexible material portions together to form a bladderless plug body having a generally rectilinear configuration when in its deflated state whereby said plug body has fabric ends exposed to the outside of said plug body;
    (c) sealing the fabric ends exposed to the outside of said plug body;
    (d) forming and bonding a tethering assembly to the plug body at opposite ends thereof; and
    (e) placing at least one port in said bladderless plug body.

2. The assembly process of claim 1, further including the step of bonding sealing ribs to one said flexible material portions to provide circumferential sealing strips about the midsection of said plug body.

3. The assembly process of claim 1, further including the step of placing a bypass assembly through said bag body.

4. The assembly process of claim 1, further including the step of providing an inflation and deflation assembly for said at least one port.

5. A method of making an inflatable fabric bag plug comprising the steps of:
    (a) cutting a plurality of coated fabric elements, each element having predetermined generally rectilinear dimensions, said plurality of fabric elements including a plug body portion, a main seam cap strip, a first and a second end seam cap strip and a pair of tether patches each having a first and a second end;
    (b) forming a tubular plug body from said plug body portion, said plug body having an inside and an outside surface, a main seam, a first end, and a second end;
    (c) bonding said main seam cap strip over said main seam;
    (d) attaching means for inflating said fabric bag plug to said plug body;
    (e) forming a first end closure from said plug body portion at said first end of the plug body, and a second end closure from the plug body portion at said second end of the plug body, said first and second end closures respectively having a first end seam and a second end seam;
    (f) bonding said first end cap strip over said first end seam to form a first end seam closure and bonding said second end cap strip over said second end seam to form said second end closure; and
    (g) forming and bonding tethering means to said plug ends comprising bonding the first end of the tether patch to the top of said plug body, bonding the second end of the tether patch to the bottom of said plug body, and folding the tether patch around a tether attachment tube and over itself whereby the tether attachment tube is captured by the tether patch;

whereby said main seam cap strip and said first and second end seam cap strips cover said respective seams to provide a leak resistant plug.

6. The method of making the inflatable fabric bag plug of claim 5, further including the step of forming and bonding sealing ribs about the periphery of said plug body for sealing the plug with an interior of a pipeline.

7. The method of making the inflatable fabric bag plug of claim 5, further including the step of testing the plug to locate and repair any leaks.

8. The method of making the inflatable fabric bag plug of claim 5, further including the step of scribing a plurality of reference lines on said plug body portion to form the following:
    (a) a first end margin on the inside surface along the first end edge, and a second end margin on the inside surface along the second edge;
    (b) a first lap seam margin on the outside surface along the first end edge, and a second lap seam margin on the outside surface along the second end edge; and
    (c) a first margin on the outside surface along the first main edge, and a second main margin on the side surface along the second main edge;

whereby the plurality of reference lines aid in said steps of forming said plug body and in forming said first and second end closures from said plug body portion.

9. The method of making the inflatable fabric bag plug of claim 5, wherein said step of forming said means for inflating said plug includes the formation of at least one port, wherein said ports are constructed and arranged to receive an inflation valve and a pressure gauge, whereby said plug may be inflated, deflated and the plug pressure monitored during use.

10. The method of making the inflatable fabric bag plug of claim 5, further comprising the step of forming a bypass assembly having a first casting assembly at the first end of said plug body, and a second casting assembly at the second end of said plug body, wherein the first and second casting assembly are connected by a flexible hose positioned within said plug body, wherein said plurality of coated fabric elements includes a first and second tethering patch and a first and a second casting reinforcement patch bonded to said first and second tethering patches, bonding said tethering patches to said first and second end of said plug body, whereby the bypass assembly provides fluid communication means through said plug.

11. The method of making the inflatable fabric bag plug of claim 6, wherein said step of forming and bonding said sealing ribs about said plug body includes the steps of:
    (a) cutting a plurality of rib extrusions; and
    (b) bonding said plurality of rib extrusions to said plug body portion to provide said plug body with circumferentially disposed sealing ribs.

12. The method of making the inflatable fabric bag plug of claim 5, wherein the step of bonding comprises:
    (a) preparing an adhesive suitable to be used for a specified time by mixing a predetermined adhesive with a predetermined catalyst;
    (b) cleaning a surface to be bonded with a predetermined solvent, and allowing the surfaces to dry;
    (c) applying a coat of said adhesive to the surface to be bonded and allowing the adhesive coat to dry; and
    (d) mating the adhesive surfaces and applying a predetermined pressure to the mated surfaces;

wherein said first and second end seams are rolled from said main seam outward and compressed evenly with a high force clamping device.

13. A process for assembling a flexible bag plug comprising:
   (a) providing at least one plug body portion and a pair of body end strips constructed of a first flexible fluid impervious sheet material of a predetermined structure;
   (b) providing a plurality of sealing strips constructed of a second flexible fluid impervious sheet material of a predetermined structure;
   (c) bonding a plurality of parallel sealing ribs to said plug body portion;
   (d) overlapping and bonding opposing sides of said plug body portion to create a flat tubular plug body structure having an interior and exterior main seam;
   (e) overlapping and bonding each said interior and exterior main seam with said sealing strips;
   (f) bonding the interior end surfaces of one end of said plug body to form a first end closure;
   (g) folding over said first end closure and bonding said folded portion to said plug body;
   (h) overlapping and bonding said folded first end closure with one said sealing cap strip constructed of said first flexible fluid impervious sheet material;
   (i) providing a first tethering structure having opposing flexible panels constructed of said first flexible fluid impervious sheet material and bonding said opposing panels to one said end of said plug body;
   (j) cutting at least one aperture through one said tethering structure panels and installing a port structure through each said at least one aperture;
   (k) bonding the interior end surfaces of the second end of said plug body to form a second end closure;
   (l) folding over said end end closure and bondin said folded to said plug body;
   (m) overlapping and bonding said folded second end closure with one said sealing cap strips constructed of said first flexible fluid impervious sheet material; and
   (n) providing a second tethering structure having opposing flexible panels constructed of said first flexible fluid impervious sheet material and bonding said opposing panels to the opposite end of said plug body.

14. The process of assembling a flexible bag plug of claim 13, wherein said first flexible fluid impervious sheet material is a layered, reinforced sheet of a predetermined strength and wherein said second flexible fluid impervious sheet provided is a generally homogeneous substrate of a predetermined strength and being lower in strength than said first flexible fluid impervious sheet.

15. The process of claim 14, wherein said first flexible fluid impervious sheet provided is a nylon fabric coated on each side with a layer of urethane and wherein said second flexible fluid impervious sheet provided is a urethane material; wherein said bonding steps include providing a two part contact adhesive and wherein said bag plug is inflated and tested for integrity.

16. The process of claim 13, wherein a bypass assembly is provided and installed through said flexible panels of said tethering structure.

17. The process of claim 13, wherein two ports are provided and wherein an inflator structure is attached to one said port and a gauge structure is attached to said second port.

18. The assembly process of claim 1 wherein said coated fabric material provided is of a nylon construction having an elastomer coated on both sides thereof.

19. The assembly process of claim 1 wherein the fabric ends exposed ion the outside of said plug body are sealed with a polyurethane material.

20. The assembly process of claim 1 wherein the bonding steps include the use of a polyurethane based adhesive.

* * * * *